United States Patent
Takeda et al.

(10) Patent No.: US 12,550,103 B2
(45) Date of Patent: Feb. 10, 2026

(54) IMPULSE RADIO ULTRA-WIDEBAND (IR-UWB) USING LONG-TERM EVOLUTION (LTE) POSITIONING PROTOCOL (LPP)

(71) Applicant: QUALCOMM Incorporated, San Diego, CA (US)

(72) Inventors: Kazuki Takeda, Minato-ku (JP); Alberto Rico Alvarino, San Diego, CA (US); Chiranjib Saha, San Diego, CA (US); Ayan Sengupta, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/256,991

(22) PCT Filed: Jan. 24, 2022

(86) PCT No.: PCT/US2022/013457
§ 371 (c)(1),
(2) Date: Jun. 12, 2023

(87) PCT Pub. No.: WO2022/169619
PCT Pub. Date: Aug. 11, 2022

(65) Prior Publication Data
US 2024/0098677 A1   Mar. 21, 2024

(30) Foreign Application Priority Data
Feb. 8, 2021   (GR) ................................. 20210100084

(51) Int. Cl.
*H04W 64/00*   (2009.01)
*H04B 1/7163*   (2011.01)

(52) U.S. Cl.
CPC ............ *H04W 64/00* (2013.01); *H04B 1/7163* (2013.01)

(58) Field of Classification Search
CPC ........ H04W 64/00; H04W 4/02; H04W 4/029; H04W 4/20; G01S 5/0236; G01S 5/0036; H04B 1/7163
See application file for complete search history.

(56) References Cited

U.S. PATENT DOCUMENTS 11,218,211 B2 * 1/2022 Denis .................... H04W 72/23
12,114,283 B2   10/2024 Edge
(Continued)

FOREIGN PATENT DOCUMENTS

CN   111405656 A   7/2020
EP   3393050 A1 * 10/2018 ........... H04B 1/7163
(Continued)

OTHER PUBLICATIONS

3GPP: "3rd Generation Partnership Project, Technical Specification Group Radio Access Network, LTE Positioning Protocol (LPP) (Release 16)", Jan. 6, 2021 (Jan. 6, 2021), pp. 1-295, XP055907598, Retrieved from the Internet: URL: https://portal.3gpp.org/desktopmodules/Specifications/SpecificationDetails.aspx?specificationid=3710, [retrieved on Mar. 31, 2022], Sections 3.1, 4.1, 4.3, 5.1, 5.2, 5.3 and 6.5.
(Continued)

*Primary Examiner* — Dung Hong
(74) *Attorney, Agent, or Firm* — Satheesh Kumar Karra; MG-IP Law, P.C.

(57) ABSTRACT

Disclosed are techniques for wireless communication. In an aspect, a user equipment (UE) transmits, to a network entity, a Long-Term Evolution (LTE) positioning protocol (LPP) capabilities message, the LPP capabilities message including one or more capability parameters indicating capabilities
(Continued)

of the UE to engage in a positioning session with at least one network node, the positioning session comprising an impulse radio ultra-wideband (IR-UWB) ranging procedure between the UE and the at least one network node, receives, from the network entity, an LPP assistance data message, the LPP assistance data message including one or more assistance parameters configuring the UE to perform at least the IR-UWB ranging procedure, and performs at least the IR-UWB ranging procedure based at least on the one or more assistance parameters.

29 Claims, 16 Drawing Sheets

(56) References Cited

U.S. PATENT DOCUMENTS

| | | | |
|---|---|---|---|
| 2020/0351047 A1 | 11/2020 | Akkarakaran et al. | |
| 2020/0389759 A1* | 12/2020 | Wang | H04W 4/023 |
| 2020/0400777 A1* | 12/2020 | Lentsch | G01S 5/0205 |
| 2024/0007989 A1* | 1/2024 | Dong | H04W 4/50 |
| 2024/0019525 A1* | 1/2024 | Thomas | H04W 64/00 |

FOREIGN PATENT DOCUMENTS

| | | | | |
|---|---|---|---|---|
| EP | 3415427 A1 | 12/2018 | | |
| EP | 3764555 A1 | 1/2021 | | |
| JP | 2010216812 A | 9/2010 | | |
| KR | 20130088951 A * | 8/2013 | | G06K 19/0723 |
| TW | 202037208 A | 10/2020 | | |
| WO | 2018038799 | 3/2018 | | |
| WO | 2020116969 A1 | 6/2020 | | |
| WO | WO-2022110176 A1 * | 6/2022 | | H04W 64/00 |

OTHER PUBLICATIONS

Corbalan P., et al., "Ultra-wideband Concurrent Ranging", arxiv.org, Cornell University Library, 201 Olin Library Cornell University Ithaca, NY 14853, Apr. 14, 2020 (Apr. 14, 2020), XP081644252, Abstract, Sections 1-3, 4.4, 5, 8 and 9.

International Search Report and Written Opinion—PCT/US2022/013457—ISA/EPO—Apr. 11, 2022.

CMCC: "Discussion on Supporting Local LMF in NG-RAN", R3-194397, 3GPP TSG RAN WG3 Meeting #105 Ljubljana, Slovenia, Aug. 26-30, 2019, pp. 1-5.

LG Electronics: "Considerations of Providing Assistance Data", R2-1711650, 3GPP TSG-RAN WG2 Meeting #99bis Prague, Czech Republic, Oct. 9-13, 2017, pp. 1-3.

Qualcomm Inc: "Segmentation of LPP Messages", R2-1803401, 3GPP TSG-RAN WG2 Meeting #101 Athens, Greece, Feb. 26-Mar. 2, 2018, 37 Pages.

Taiwan Search Report—TW111103198—TIPO—May 1, 2025.

* cited by examiner

IMPULSE RADIO ULTRA-WIDEBAND (IR-UWB) USING LONG- TERM EVOLUTION (LTE) POSITIONING PROTOCOL (LPP)

CROSS-REFERENCE TO RELATED APPLICATIONS

The present Application for Patent claims priority to Greek Patent Application No. 20210100084, entitled "IMPULSE RADIO ULTRA WIDEBAND (IR-UWB) USING LONG-TERM EVOLUTION (LTE) POSITIONING PROTOCOL (LPP)," filed Feb. 8, 2021, and is a national stage application, filed under 35 U.S.C. § 371, of International Patent Application No. PCT/US2022/013457, entitled "IMPULSE RADIO ULTRA-WIDEBAND (IR-UWB) USING LONG-TERM EVOLUTION (LTE) POSITIONING PROTOCOL (LPP)," filed Jan. 24, 2022, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A method of wireless communication performed by a user equipment (UE) includes transmitting, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; receiving, from the network entity, an LPP assistance data message, the LPP assistance data message including one or more assistance parameters configuring the UE to perform at least the IR-UWB ranging procedure; and performing at least the IR-UWB ranging procedure based at least on the one or more assistance parameters.

In an aspect, a user equipment (UE) includes a memory; at least one transceiver; and at least one processor communicatively coupled to the memory and the at least one transceiver, the at least one processor configured to: transmit, via the at least one transceiver, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; receive, via the at least one transceiver, from the network entity, an LPP assistance data message, the LPP assistance data message including one or more assistance parameters configuring the UE to perform at least the IR-UWB ranging procedure; and perform at least the IR-UWB ranging procedure based at least on the one or more assistance parameters.

In an aspect, a user equipment (UE) includes means for transmitting, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; means for receiving, from the network entity, an LPP assistance data message, the LPP assistance data message including one or more assistance parameters configuring the UE to perform at least the IR-UWB ranging procedure; and means for performing at least the IR-UWB ranging procedure based at least on the one or more assistance parameters.

In an aspect, a non-transitory computer-readable medium stores computer-executable instructions includes computer-executable instructions that, when executed by a user equipment (UE), cause the UE to: transmit, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; receive, from the network entity, an LPP assistance data message, the LPP assistance data message including one or more assistance parameters configuring the UE to perform at least the IR-UWB ranging procedure; and perform at least the IR-UWB ranging procedure based at least on the one or more assistance parameters.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
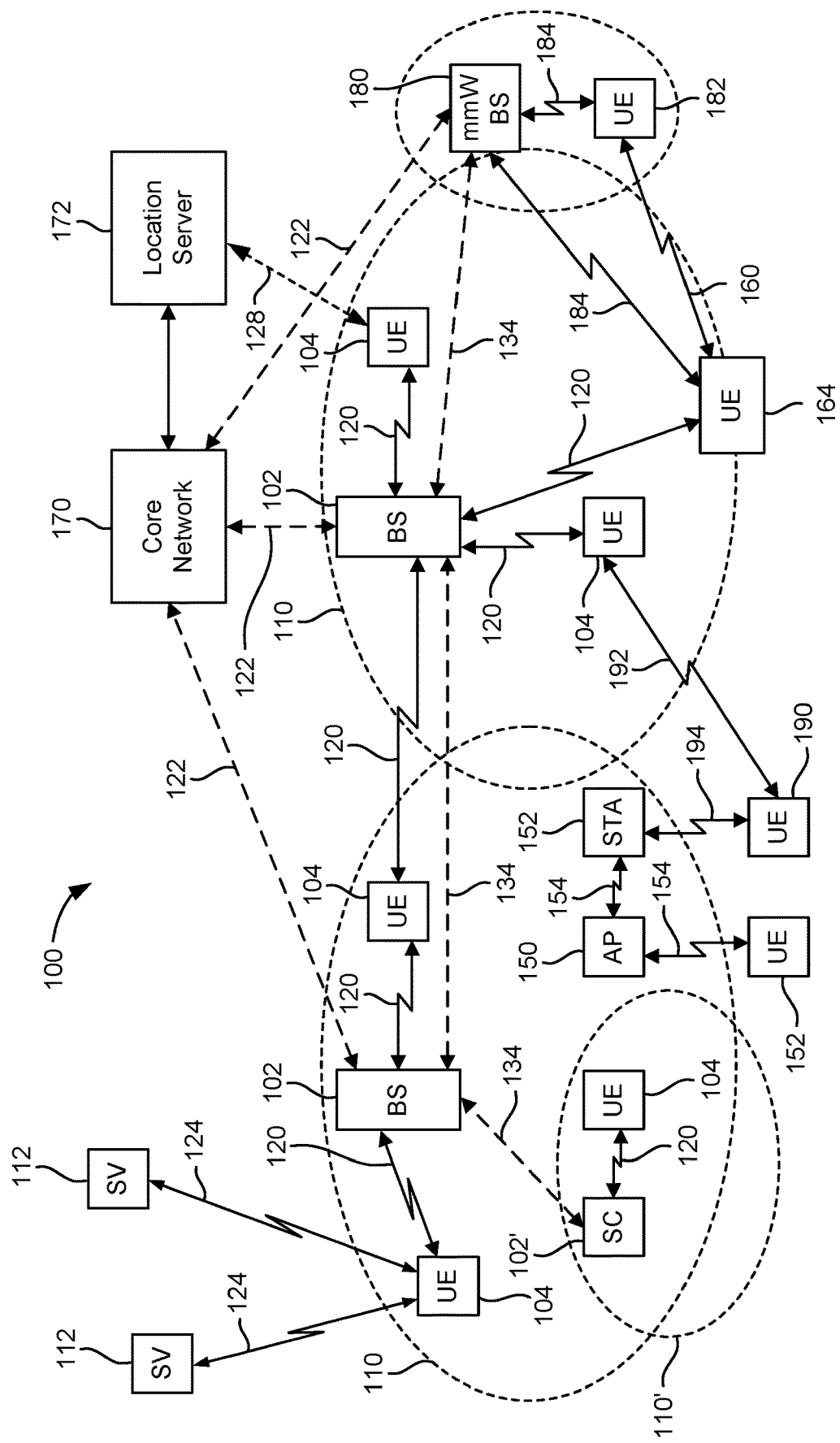
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
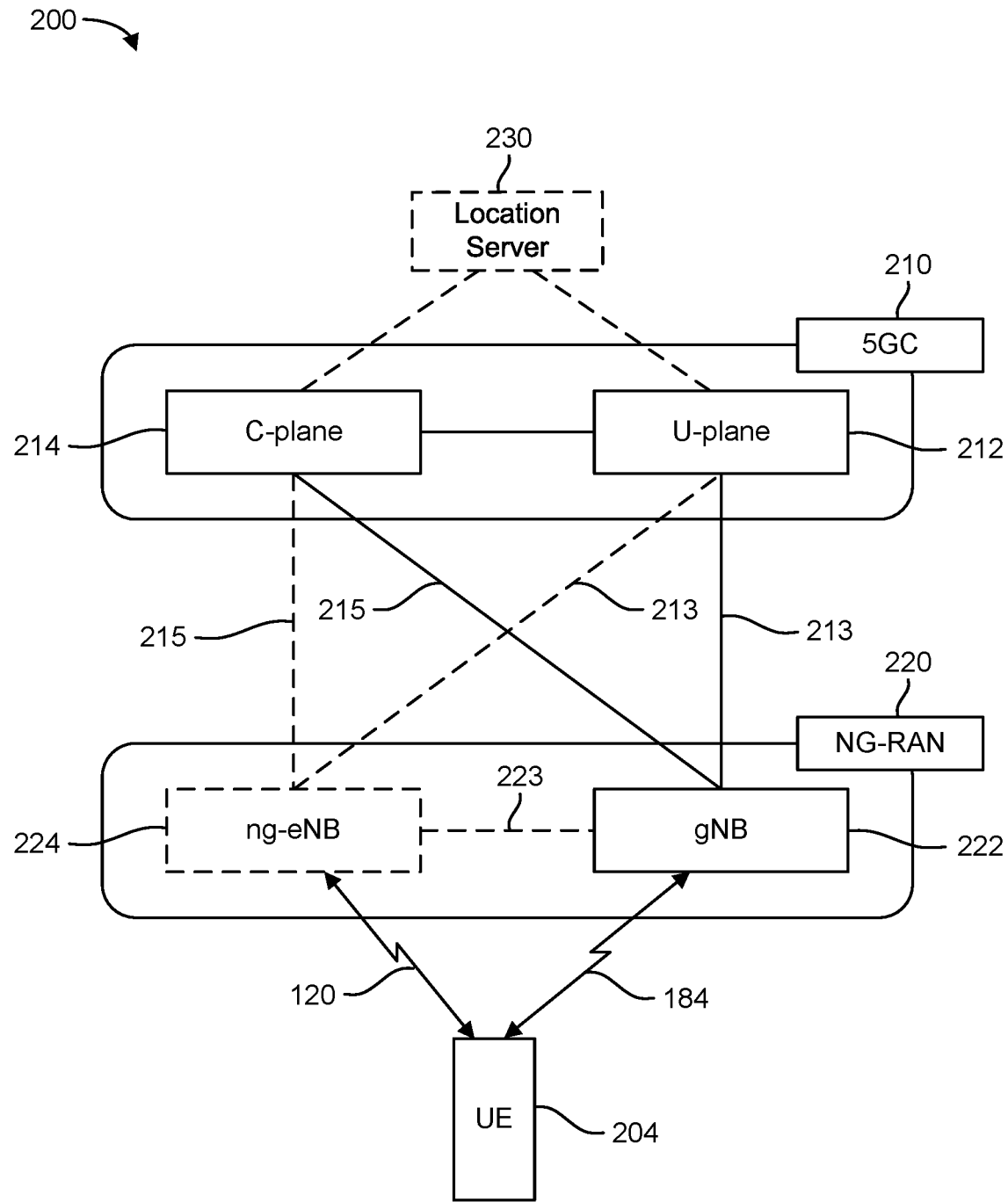
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
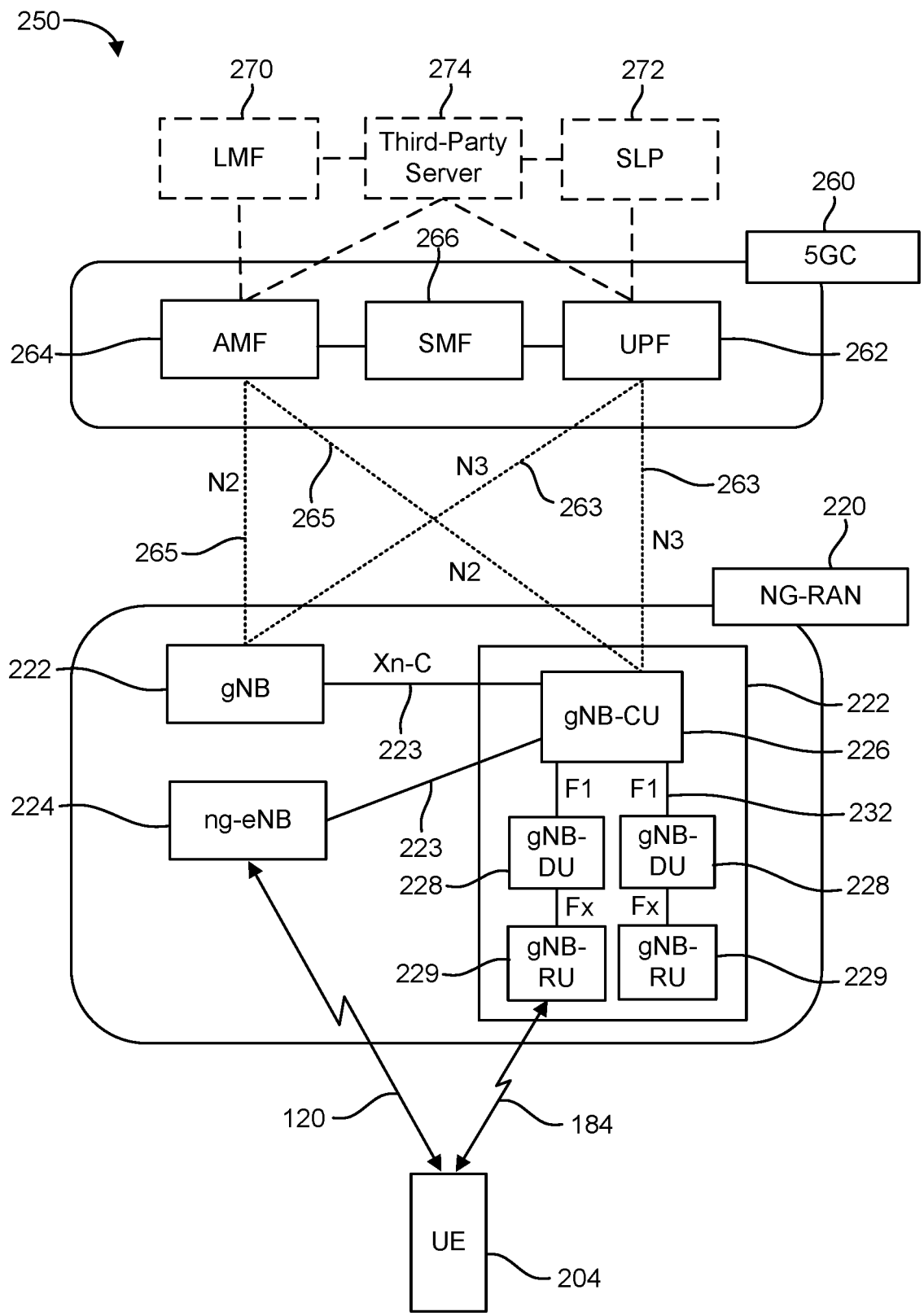

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
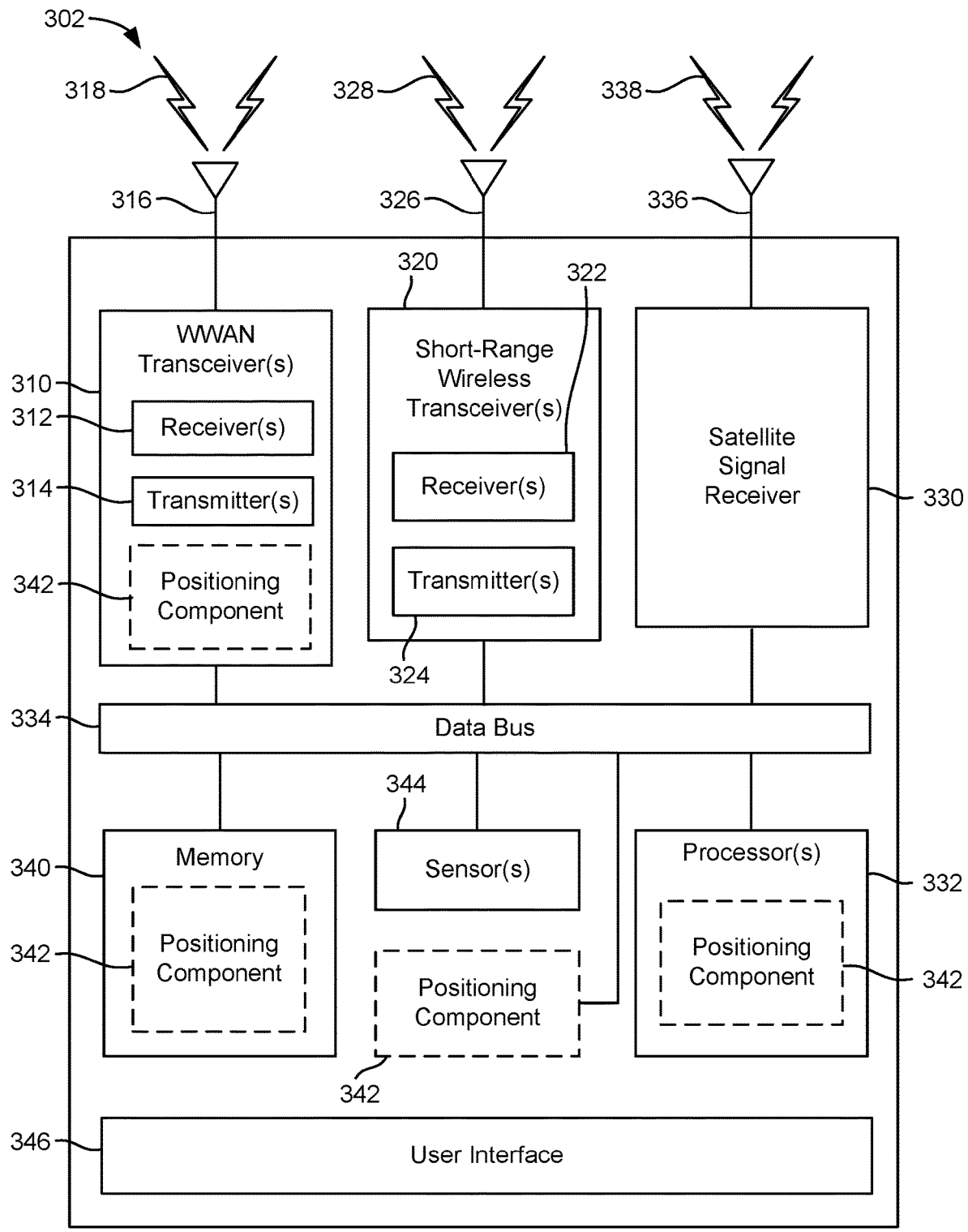
FIGS. 3A to 3C are simplified block diagrams of several sample aspects of components that may be employed in a user equipment (UE), a base station, and a network entity, respectively, and configured to support communications as taught herein.
Figure 3B:
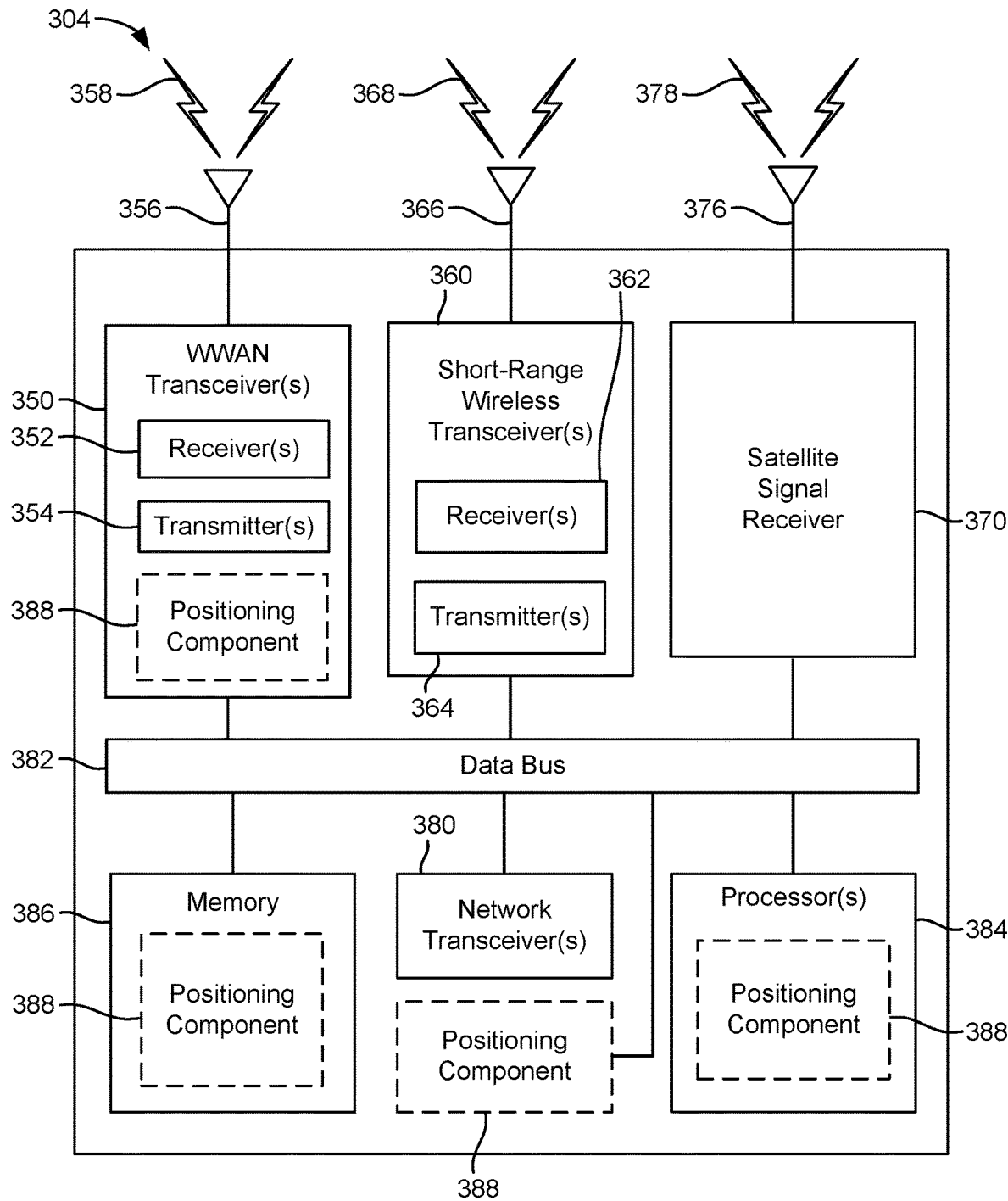
Figure 3C:
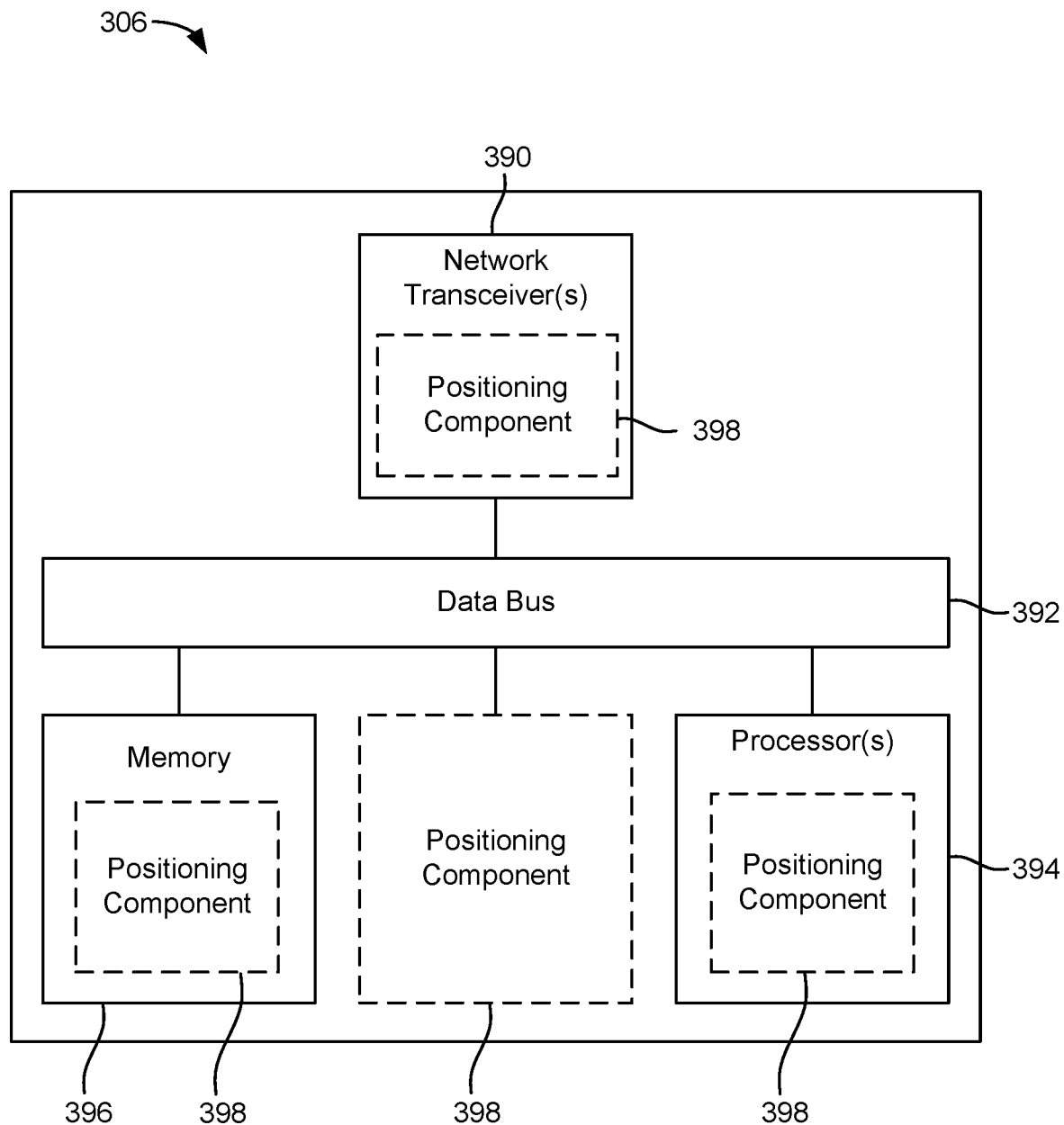

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

In LTE and, at least in some cases, NR, positioning measurements are reported through higher layer signaling, specifically, LTE positioning protocol (LPP) and/or RRC. LPP is defined in 3GPP technical specification (TS) 37.355, which is publicly available and incorporated by reference herein in its entirety. LPP is used point-to-point between a location server (e.g., location server 230, LMF 270, SLP 272) and a UE (e.g., any of the UEs described herein) in order to position the LUE using location related measurements obtained from one or more reference sources.

Figure 4:
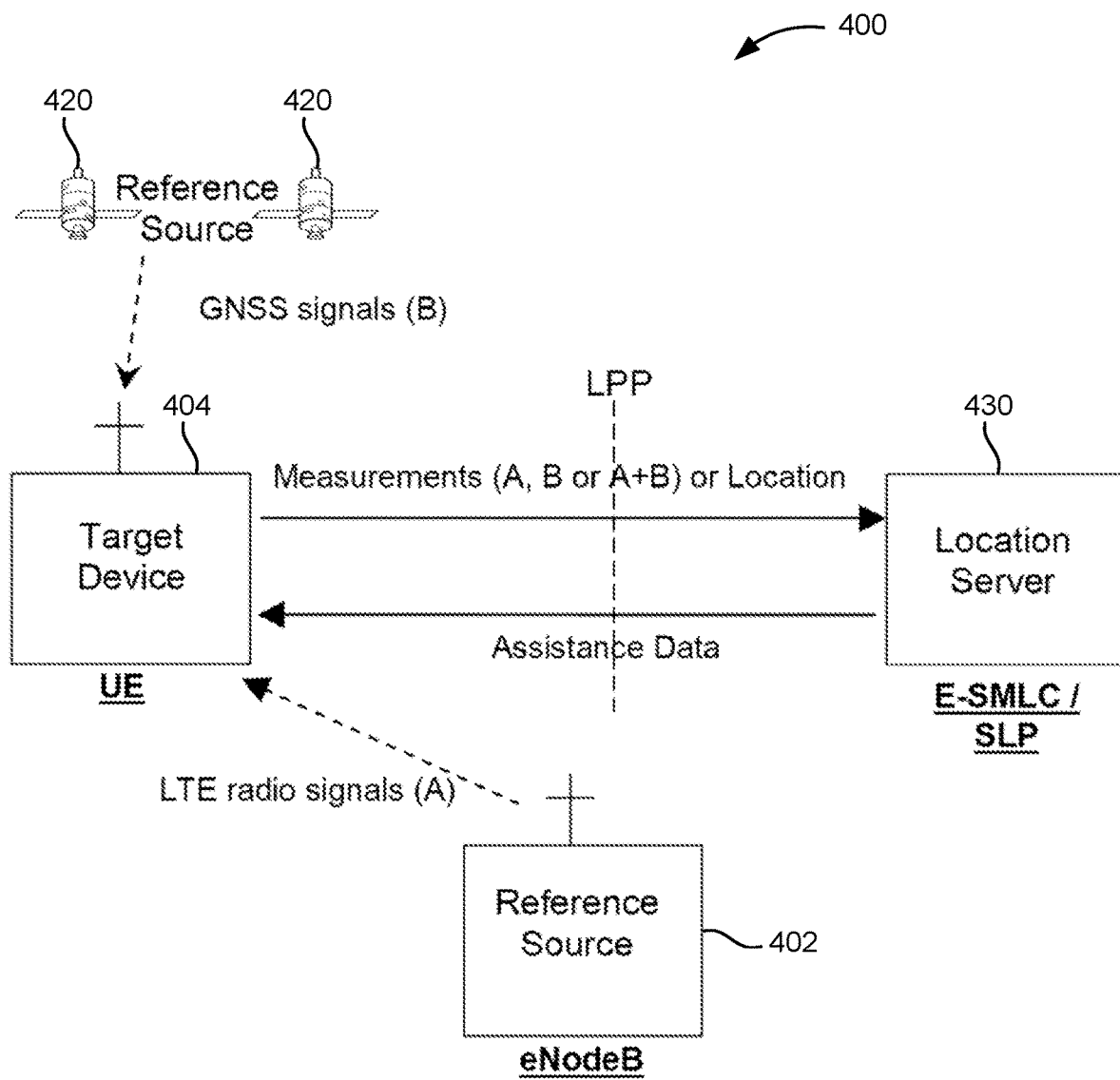
FIG. 4 illustrates example Long-Term Evolution (LTE) positioning protocol (LPP) reference sources for positioning.

FIG. 4 is a diagram 400 illustrating example LPP reference sources for positioning. In the example of FIG. 4, a target device, specifically a LUE 404 (e.g., any of the UEs described herein), is engaged in an LPP session with a location server 430 (labeled as an "E-SMLC/SLP" in the specific example of FIG. 4). The UE 404 is also receiving/measuring wireless positioning signals from a first reference source, specifically one or more base stations 402 (which may correspond to any of the base stations described herein, and which is labelled as an "eNode B" in the specific example of FIG. 4), and a second reference source, specifically one or more SPS satellites 420 (which may correspond to SVs 112 in FIG. 1).

An LPP session is used between a location server 430 and a UE 404 in order to obtain location-related measurements or a location estimate or to transfer assistance data. A single LPP session is used to support a single location request (e.g., for a single mobile-terminated location request (MT-LR), mobile originated location request (MO-LR), or network induced location request (NI-LR)). Multiple LPP sessions can be used between the same endpoints to support multiple different location requests. Each LPP session comprises one or more LPP transactions, with each LPP transaction performing a single operation (e.g., capability exchange, assistance data transfer, location information transfer). LPP transactions are referred to as LPP procedures. The instigator of an LPP session instigates the first LPP transaction, but subsequent transactions may be instigated by either endpoint. LPP transactions within a session may occur serially or in parallel. LPP transactions are indicated at the LPP protocol level with a transaction identifier in order to associate messages with one another (e.g., request and response). Messages within a transaction are linked by a common transaction identifier.

LPP positioning methods and associated signaling content are defined in the 3GPP LPP standard (3GPP Technical Specification (TS) 36.355, which is publicly available and incorporated by reference herein in its entirety). LPP signaling can be used to request and report measurements related to the following positioning methods: observed time difference of arrival (OTDOA), downlink time difference of arrival (DL-TDOA), assisted global navigation satellite system (A-GNSS), LTE enhanced cell identity (E-CID), NR E-CID, sensor, terrestrial beacon system (TBS), WLAN, Bluetooth, downlink angle of departure (DL-AoD), uplink angle of arrival (UL-AoA), and multi-round-trip-time (RTT). Currently, LPP measurement reports may contain the following measurements: (1) one or more time of arrival (ToA), time difference of arrival (TDOA), reference signal time difference (RSTD), or reception-to-transmission (Rx-Tx) measurements, (2) one or more AoA and/or AoD measurements (currently only for a base station to report UL-AoA and DL-AoD to the location server 430), (3) one or more multipath measurements (per-path ToA, reference signal received power (RSRP), AoA/AoD), (4) one or more motion states (e.g., walking, driving, etc.) and trajectories (currently only for the UE 404), and (5) one or more report quality indications. In the present disclosure, positioning measurements, such as the example measurements just listed, and regardless of the positioning technology, may be referred to collectively as positioning state information (PSI).

The UE 404 and/or the location server 430 may derive location information from one or more reference sources, illustrated in the example of FIG. 4 as SPS satellite(s) 420 and the base station(s) 402. Each reference source can be used to calculate an independent estimate of the location of the UE 404 using associated positioning techniques. In the example of FIG. 4, the UE 404 is measuring characteristics (e.g., ToA, RSRP, RSTD, etc.) of positioning signals received from the base station(s) 402 to calculate, or to assist the location server 430 to calculate, an estimate of the location of the UE 404 using one or more cellular network-based positioning methods (e.g., multi-RTT, OTDOA, DL-TDOA, DL-AoD, E-CID, etc.). Similarly, the UE 404 is measuring characteristics (e.g., ToA) of GNSS signals received from the SPS satellites 420 to triangulate its location in two or three dimensions, depending on the number of SPS satellites 420 measured. In some cases, the UE 404 or the location server 430 may combine the location solutions derived from each of the different positioning techniques to improve the accuracy of the final location estimate.

As noted above, the UE 404 uses LPP to report location related measurements obtained from different of reference sources (e.g., base stations 402, Bluetooth beacons, SPS satellites 420, WLAN access points, motion sensors, etc.). As an example, for GNSS-based positioning, the UE 404 uses the LPP information element (IE) "A-GNSS-ProvideLocationInformation" to provide location measurements (e.g., pseudo ranges, location estimate, velocity, etc.) to the location server 430, together with time information. It may also be used to provide a GNSS positioning-specific error reason. The "A-GNSS-ProvideLocationInformation" IE includes IEs such as "GNSS-SignalMeasurementInformation," "GNSS-LocationInformation," "GNSS-MeasurementList," and "GNSS-Error." The UE 404 includes the "GNSS-LocationInformation" IE when it provides location and optionally velocity information derived using GNSS or hybrid GNSS and other measurements to the location server 430. The UE 404 uses the "GNSS-SignalMeasurementInformation" IE to provide GNSS signal measurement information to the location server 430 and the GNSS network time association if requested by the location server 430. This information includes the measurements of code phase, Doppler, C/No, and optionally accumulated carrier phase, also referred to as accumulated delta range (ADR), which enable the UE assisted GNSS method where location is computed in the location server 430. The UE 404 uses the "GNSS-MeasurementList" IE to provide measurements of code phase, Doppler, C/No, and optionally accumulated carrier phase (or ADR).

As another example, for motion sensor-based positioning, the currently supported positioning methods use a barometric pressure sensor and a motion sensor, as described in 3GPP TS 36.305 (which is publicly available and incorporated by reference herein in its entirety). The UE 404 uses the LPP IE "Sensor-ProvideLocationInformation" to provide location information for sensor-based methods to the location server 430. It may also be used to provide a sensor-specific error reason. The UE 404 uses the "Sensor-MeasurementInformation" IE to provide sensor measurements (e.g., barometric readings) to the location server 430. The UE 404 uses the "Sensor-MotionInformation" to provide movement information to the location server 430. The movement information may comprise an ordered series of points. This information may be obtained by the UE 404 using one or more motion sensors (e.g., accelerometers, barometers, magnetometers, etc.).

As yet another example, for Bluetooth-based positioning, the UE 404 uses the "BT-ProvideLocationInformation" IE to provide measurements of one or more Bluetooth beacons to the location server 430. This IE may also be used to provide Bluetooth positioning specific error reason.

Figure 5:
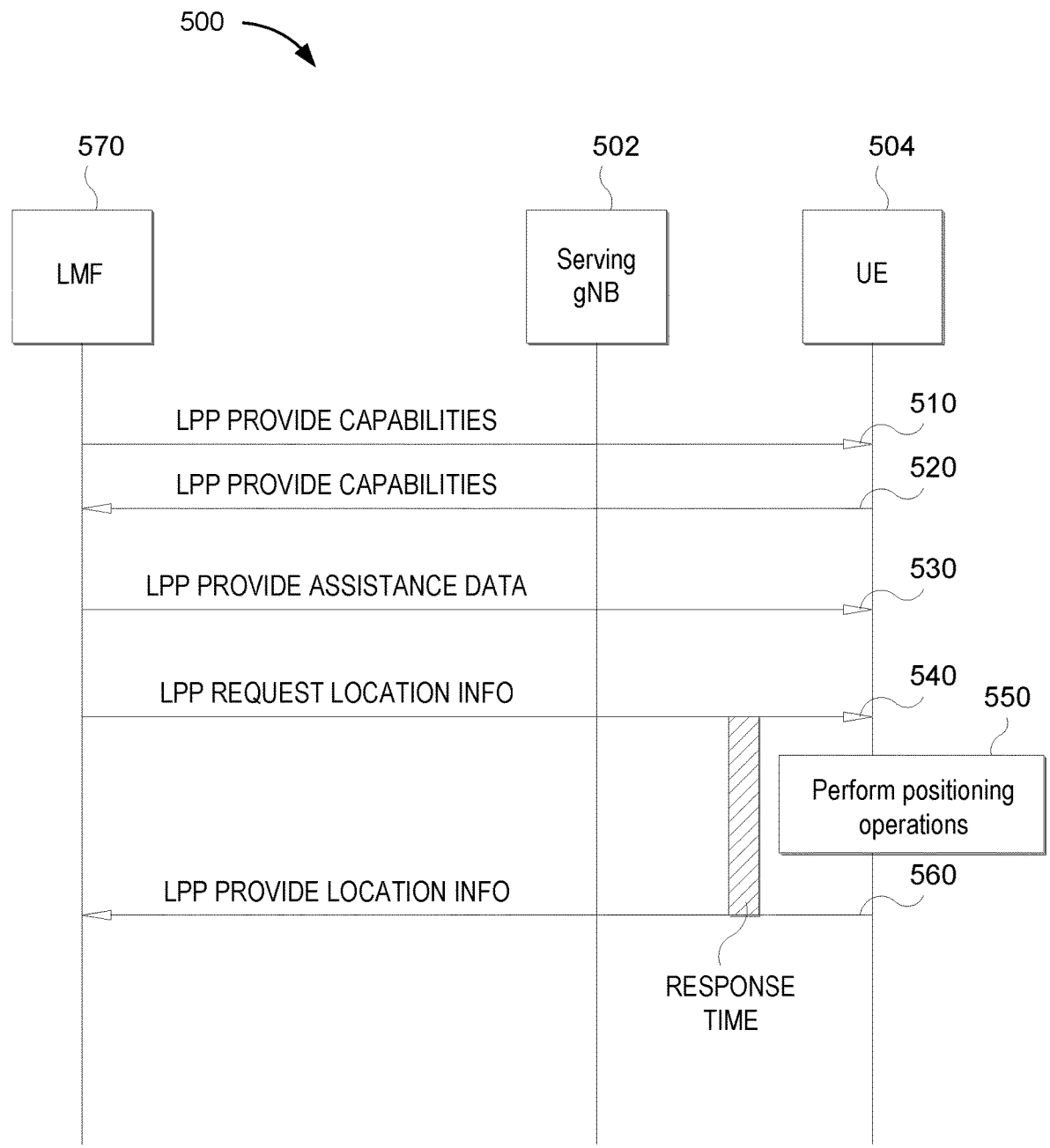
FIG. 5 illustrates an example LPP call flow between a UE and a location server for performing positioning operations.

FIG. 5 illustrates an example LPP procedure 500 between a UE 504 and a location server (illustrated as an LMF 570) for performing positioning operations. As illustrated in FIG. 5, positioning of the UE 504 is supported via an exchange of LPP messages between the UE 504 and the LMF 570. The LPP messages may be exchanged between UE 504 and the LMF 570 via the UE's 505 serving base station (illustrated as a serving gNB 502) and a core network (not shown). The LPP procedure 500 may be used to position the UE 504 in order to support various location-related services, such as navigation for UE 504 (or for the user of UE 504), or for routing, or for provision of an accurate location to a public safety answering point (PSAP) in association with an emergency call from UE 504 to a PSAP, or for some other reason. The LPP procedure 500 may also be referred to as a positioning session, and there may be multiple positioning sessions for different types of positioning methods (e.g., DL-TDOA, RTT, E-CID, etc.).

Initially, the UE 504 may receive a request for its positioning capabilities from the LMF 570 at stage 510 (e.g., an LPP Request Capabilities message). At stage 520, the UE 504 provides its positioning capabilities to the LMF 570 relative to the LPP protocol by sending an LPP Provide Capabilities message to LMF 570 indicating the position methods and features of these position methods that are supported by the UE 504 using LPP. The capabilities indicated in the LPP Provide Capabilities message may, in some aspects, indicate the type of positioning the UE 504 supports (e.g., DL-TDOA, RTT, E-CID, etc.) and may indicate the capabilities of the UE 504 to support those types of positioning.

Upon reception of the LPP Provide Capabilities message, at stage 520, the LMF 570 determines to use a particular type of positioning method (e.g., DL-TDOA, RTT, E-CID, sensors, TBS, WLAN, Bluetooth, etc.) based on the indicated type(s) of positioning the UE 504 supports and determines a set of, for example, one or more transmission-reception points (TRPs) from which the UE 504 is to measure downlink positioning reference signals or towards which the UE 504 is to transmit uplink positioning reference signals. At stage 530, the LMF 570 sends an LPP Provide Assistance Data message to the UE 504 identifying the set of TRPs.

In some implementations, the LPP Provide Assistance Data message at stage 530 may be sent by the LMF 570 to the UE 504 in response to an LPP Request Assistance Data message sent by the UE 504 to the LMF 570 (not shown in FIG. 5). An LPP Request Assistance Data message may include an identifier of the UE's 504 serving TRP and a request for the positioning reference signal (PRS) configuration of neighboring TRPs.

At stage 540, the LMF 570 sends a request for location information to the UE 504. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 530 may be sent after the LPP Request Location Information message at 540 if, for example, the UE 504 sends a request for assistance data to LMF 570 (e.g., in an LPP Request Assistance Data message, not shown in FIG. 5) after receiving the request for location information at stage 540.

At stage 550, the UE 504 utilizes the assistance information received at stage 530 and any additional data (e.g., a desired location accuracy or a maximum response time) received at stage 540 to perform positioning operations (e.g., measurements of DL-PRS, transmission of UL-PRS, etc.) for the selected positioning method.

At stage 560, the UE 504 may send an LPP Provide Location Information message to the LMF 570 conveying the results of any measurements that were obtained at stage 550 (e.g., time of arrival (ToA), reference signal time difference (RSTD), reception-to-transmission (Rx-Tx), etc.) and before or when any maximum response time has expired (e.g., a maximum response time provided by the LMF 570 at stage 540). The LPP Provide Location Information message at stage 560 may also include the time (or times) at which the positioning measurements were obtained and the identity of the TRP(s) from which the positioning measurements were obtained. Note that the time between the request for location information at 540 and the response at 560 is the "response time" and indicates the latency of the positioning session.

The LMF 570 computes an estimated location of the UE 504 using the appropriate positioning techniques (e.g., DL-TDOA, RTT, E-CID, sensors, WLAN, Bluetooth, etc.) based, at least in part, on measurements received in the LPP Provide Location Information message at stage 560.

Impulse radio ultra-wideband (IR-UWB) is being explored as another avenue for providing positioning services. UWB is currently used for radar sensing, and is defined in, among other standards, the IEEE 802.15.4a/4z standard (which is publicly available and incorporated by reference herein in its entirety). An IR-UWB radar recognizes an event by radiating a very narrow pulse-shaped reference signal and analyzing the reflections from target objects or a human body. An IR-UWB radar is not affected by lighting conditions and there is no harmful effect on the human body, as the emission power of an IR-UWB radar is extremely low.

Due to its various advantages over existing context-aware sensors and smart computing ability, IR-UWB radar shows significant potential in a wide variety of practical applications, such as safety and security, 2D/3D positioning and tracking, health monitoring, elderly care, smart home and smart building, smart/autonomous vehicles, gesture recognition, radar imaging, see-through-wall, and so on. In particular, as the IoT has increased, the role of IR-UWB radar is increasing in importance.

The following are some important features of UWB systems generally, including IR-UWB. The most important characteristic of UWB is its large bandwidth compared to prevalent narrowband systems. One result of the large bandwidth of UWB is that due to the inverse relationship of time and frequency, the lifetime of UWB signals is very short. Consequently, the time resolution of UWB signals is high and UWB is a good candidate for positioning. UWB systems are also suitable for high speed communication due to their wide bandwidth. Another useful property of UWB is that it is permitted to occupy low carrier frequencies, where signals can more easily pass through obstacles. UWB signals can also be transmitted in baseband so there is no need for intermediate frequency (IF) multipliers in transceivers. This property can lead to simpler and less expensive hardware. The high time resolution and short wavelength of UWB signals strengthen it against multipath interference and fading. In addition, the shape of UWB signals is similar to noise so there is a lower chance of eavesdropping. Finally, UWB is a radio communication over an ultra-wide bandwidth with limited effective isotropic radiated power (EIRP).

Figure 6:
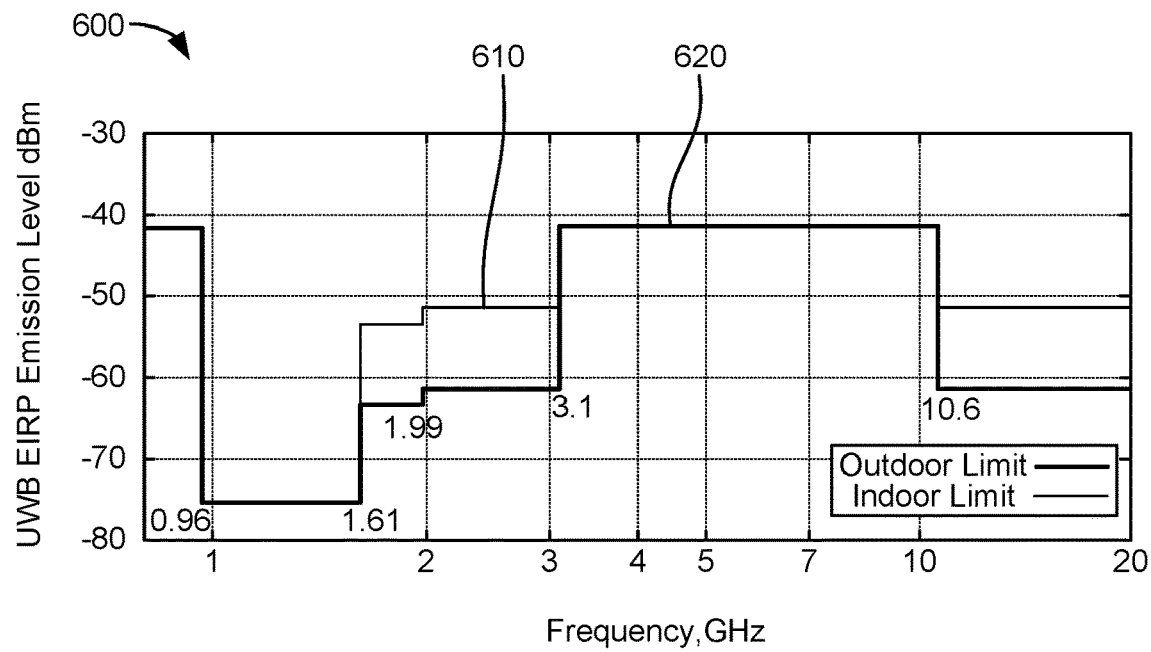
FIG. 6 illustrates a graph showing the permissible ultra-wideband (UWB) effective isotropic radiated power (EIRP) emission level for different frequency bandwidths.

FIG. 6 illustrates a graph 600 showing the permissible UWB EIRP emission level (in decibel-milliwatts (dBm)) for different frequency bandwidths (in gigahertz (GHz)). The EIRP limits have been set by the United States Federal Communication Commission (FCC). There is one set of limits for indoor operation (indicated by line 610) and another set of limits for outdoor operation (indicated by line 620). As shown in FIG. 6, the EIRP is limited to less than −40 dBm, with portions of the available bandwidth having even lower limits. For example, for the bandwidth from 3.1 GHz to 10.6 GHz, the permissible EIRP is 41.3 dBm. In the other regions (outside of the United States), there are different regulations on UWB EIRP emission level for different frequencies. However, in many regions, an UWB emission level of higher than −40 dBm is not allowed on any carrier frequency.

Figure 7:
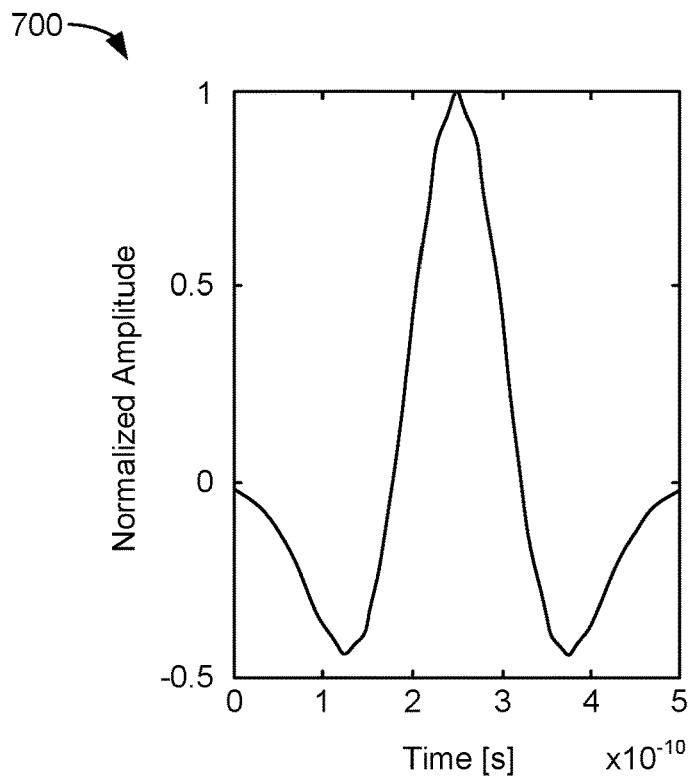
FIG. 7 illustrates a graph showing a typical impulse radio UWB (IR-UWB) pulse.

FIG. 7 illustrates a graph 700 showing a typical IR-UWB pulse. The graph 700 has been normalized in the frequency domain, meaning the amplitude of the pulse ranges from 0 to 1. An example pulse bandwidth is 500 MHz. In the time domain, the pulse has a width of approximately 2 nanoseconds (ns), or $10^{-10}$. An example UWB pulse, as illustrated in graph 700, is Gaussian, meaning that $$p(t) = \frac{A}{\sqrt{2\pi\sigma^2}} e^{-\frac{t^2}{2\sigma^2}}$$

and its n-th derivative.

Figure 8:
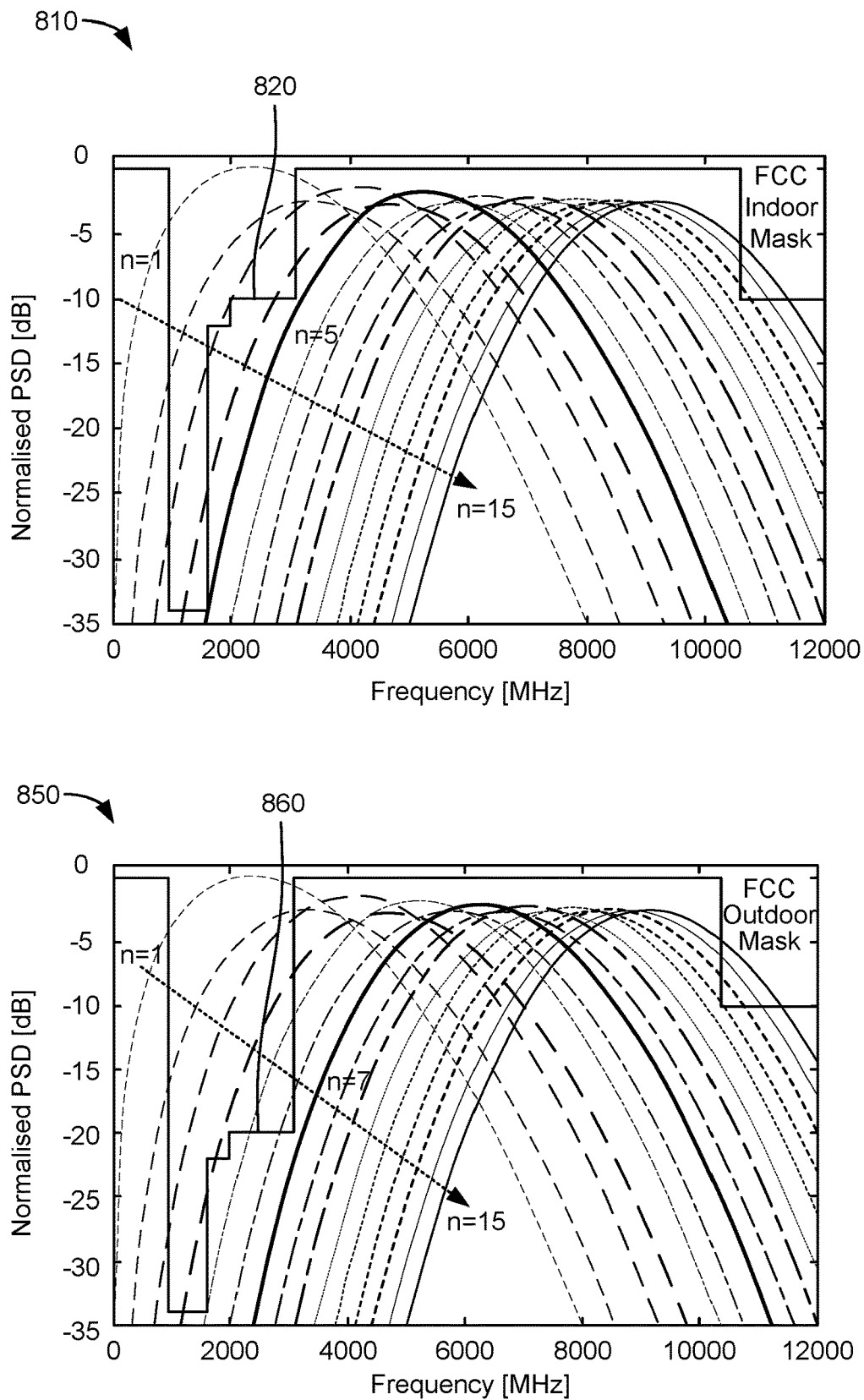
FIG. 8 illustrates two graphs showing the power spectral density (PSD) over frequency for a series of higher order derivatives of the Gaussian pulse described with reference to FIG. 7.

FIG. 8 illustrates two graphs 810 and 850 showing the power spectral density (PSD) (the signal energy transmitted over a finite time period and frequency spectrum) in decibels (dB) over frequency in megahertz (MHz) for a series of higher order derivatives of the Gaussian pulse described above with reference to FIG. 7. Specifically, graphs 810 and 820 illustrate the IR-UWB Gaussian pulses for n=1 to n=15. The graphs 810 and 850 have been normalized in the frequency domain. As such, 0 dB corresponds to −40 dB on the graph 600 in FIG. 6.

Overlaid on the graph 810 is a line 820 indicating the FCC limits for indoor UWB systems. Line 820 corresponds to line 610 in FIG. 6. As shown in graph 810, the higher order derivative of the Gaussian pulse at n=5 is the first pulse that meets the FCC indoor limits denoted by line 820.

Similarly, overlaid on the graph 850 is a line 860 indicating the FCC limits for outdoor UWB systems. Line 860 corresponds to line 620 in FIG. 6. As shown in graph 850, the higher order derivative of the Gaussian pulse at n=7 is the first pulse that meets the FCC outdoor limits denoted by line 860.

In IR-UWB systems, data is transmitted by low duty UWB signals, and the information of a symbol is conveyed by position and/or polarity of the signals. Each symbol corresponds to one or more signals. A combination of burst position modulation (BPM) and binary phase-shift keying (BPSK) can be used to modulate the symbols, with each symbol being composed of an active burst of UWB pulses.

Figure 9:
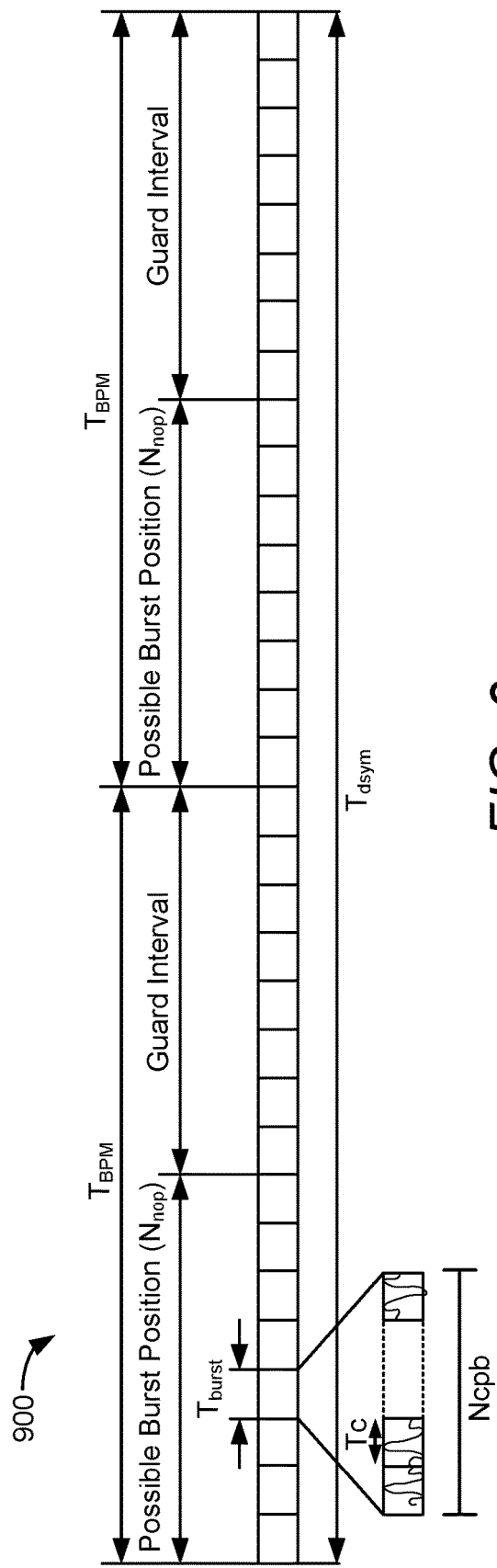
FIG. 9 is a diagram of an example symbol used in IR-UWB systems.

FIG. 9 is a diagram of an example symbol 900 used in IR-UWB systems. The symbol 900 may be composed of various time and/or frequency resources. The overall length of the symbol 900 in the time domain (labeled $T_{dsym}$) is divided into two BPM intervals having a length $T_{BPM}$. In the BPM-BPSK modulation scheme, each symbol 900 may be capable of carrying two bits of information: one bit may be used to determine the position (labeled $N_{hop}$) of a burst of pulses (first or second BPM interval), and an additional bit may be used to modulate the phase (polarity) of this same burst. A guard interval is included to limit the amount of inter-symbol interference caused by multipath. In the example of FIG. 9, there are eight possible burst positions ($N_{hop}$=8) per BPM interval. Each burst has a length, or burst interval, of $T_{burst}$. A burst is composed of $N_{cpb}$ chirps, each having a chirp length, or chirp interval, of $T_c$.

Figure 10:
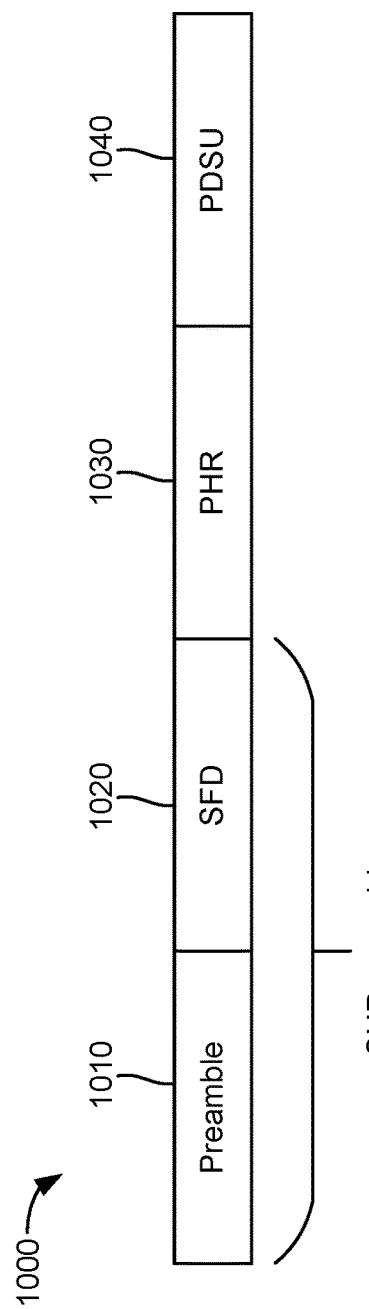
FIG. 10 is a diagram of an example physical layer frame used in IR-UWB systems.

FIG. 10 is a diagram of an example physical layer frame 1000 used in IR-UWB systems. The physical layer frame 1000 may also be referred to as a physical protocol data unit (PPDU), and is composed of three parts, a synchronization header (SHR) preamble composed of a preamble field 1010 and a start of frame delimiter (SFD) field 1020, a physical layer header (PHR) field 1030, and a physical layer service data unit (PDSU) 1040.

The preamble field 1010 is used to synchronize entities with informing the arrival of a packet. The length of the preamble field 1010 may be one of 16, 64, 1024, or 4096 symbols. The preamble field 1010 may carry one of eight possible symbol sequences. The symbol sequences have an important property, referred to as perfect periodic auto-correlation, which reduces the error in ranging caused by multipath propagation.

The SFD field 1020 is a short sequence of 8 or 64 symbols that signals the end of the preamble and the start the of the PHR field 1030. In the ranging protocols (discussed below), the arrival time of a signal and the processing time between the arrival and the transmission back of an acknowledgment should be measured precisely. The SDF field 1020 is short in order to trigger the start and stop times, which is needed for precise timing.

The PHR field 1030 is the physical layer header and contains information about the data to be received, including the length of the data and the data rate used to transmit the data. The PHR field 1030 has a length of 19 bits, including six single error correction double error detection (SECDED) bits, and may be transmitted at a data rate of 110 or 850 kilobits per second (kbs).

The PDSU 1040 is the actual payload of encoded user data. It may be transmitted at a data rate from 110 kbs to 27.24 megabits per second (Mbs).

There are two different ranging protocols. The basic protocol is two-way time of arrival (TW-TOA). The second one, which is more precise, is symmetric double-sided (SDS) TW-TOA.

Figure 11:
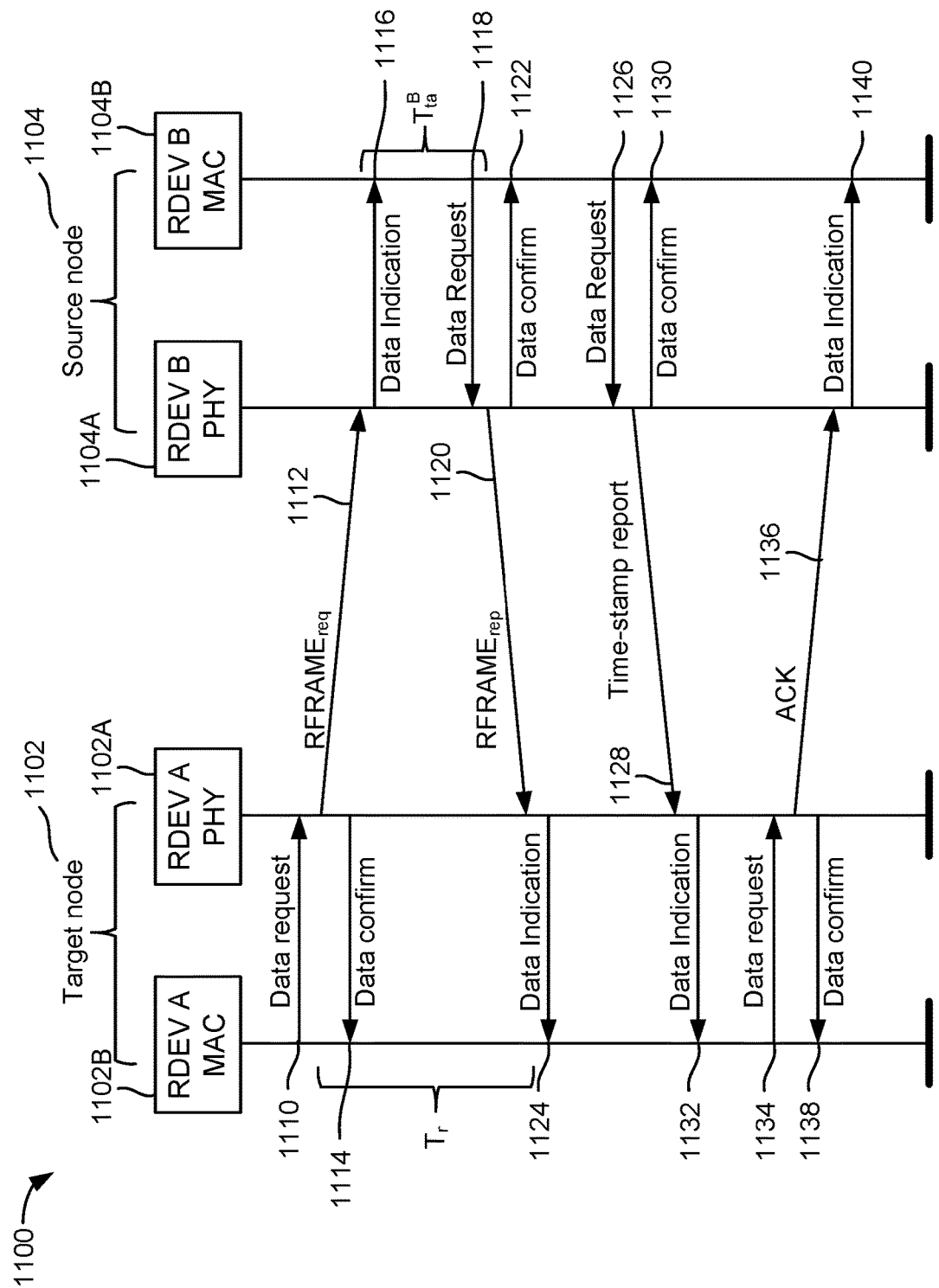
FIG. 11 illustrates an example two-way time of arrival (TW-TOA) method

FIG. 11 illustrates an example TW-TOA ranging procedure 1100. The TW-TOA ranging procedure 1100 is performed between a target node 1102 (e.g., a UE, base station, AP, etc.) being positioned and a source node 1104 (e.g., another UE, base station, AP, etc.). The target node 1102 includes an RDEV A PHY entity 1102A and an RDEV A MAC entity 1102B. Similarly, the source node 1104 includes an RDEV B PHY entity 1104A and an RDEV B MAC entity 1104B. The term "RDEV" simply refers to a device capable of performing a TW-TOA ranging procedure 1100.

At 1110, the RDEV A MAC entity 1102B of the target node 1102 sends a data request to the RDEV A PHY entity 1102A to send a ranging request to the source node 1104. At 1112, the RDEV A PHY entity 1102A sends the ranging request, labeled "$RFRAMfE_{req}$," to the source node 1104, and records the departure time of the ranging request, labeled "T1." At 1114, the RDEV A PHY entity 1102A sends a confirmation to the RDEV A MAC entity 1102B indicating that the ranging request has been sent.

At 1116, the RDEV B PHY entity 1104A of the source node 1104 receives the ranging request and sends a data indication to the RDEV B MAC entity 1104B to indicate that a ranging request has been received. At 1118, the RDEV B MAC entity 1104B sends a data request to the RDEV B PHY entity 1104A to send a ranging response to the target node 1102. At 1120, the RDEV B PHY entity 1104A sends a ranging response, labeled "$RFRAME_{rep}$," to the target node 1102. At 1122, the RDEV B PHY entity 1104A sends a confirmation to the RDEV B MAC entity 1104B indicating that the ranging response has been sent.

At 1124, the RDEV A PHY entity 1102A receives the ranging response and sends a data indication to the RDEV A MAC entity 1102B to indicate that the ranging response has been received. The target node 1102 records the arrival time of the ranging response, labeled "T2." The target node 1102 can then compute the round-trip time, labeled $T_r$, as $T_r$=T2−T1. The target node 1102 can then compute the time of flight (TOF) between the target node 1102 and the source node 1104 (referred to as "$T_{TW}$"), which is given by $T_{TW}$=$T_r$/2. The distance between the two nodes is given by d=c*$T_{TW}$, where c is the speed of light. With three distances from three source nodes 1104, the target node 1102 can determine its location based on the known locations of the source nodes 1104.

In practice, as shown in FIG. 11, there is a delay at the source node 1104 between reception of the ranging request and transmission of the ranging response, referred to as the turnaround time and labeled $T_{ta}$ (or $T_{ta}^B$ for the source node 1104). Due to the high speed of the light, a $T_{ta}^B$ of nanoseconds can cause a ranging error of tens of centimeters. Consequently, it is important to have an accurate estimate of $T_{ta}^B$.

To address this issue, an estimate of $T_{ta}^B$ can be provided to the target node 1102 for more accurate ranging. Specifically, a counter (or timer) in the source node 1104 is started when the RDEV B PHY entity 1104A detects the first symbol of the SFD of the ranging request and stops when the first symbol of the SFD of the ranging response is sent. Then, after sending the ranging response at 1118 to 1122, the source node 1104 sends a timestamp report including the start and stop values of the counter, or the value of $T_{ta}^B$. Specifically, at 1126, the RDEV B MAC entity 1104B sends a data request to the RDEV B PHY entity 1104A to send a timestamp report to the target node 1102. At 1128, the RDEV B PHY entity 1104A sends the timestamp report to the target node 1102. The timestamp report includes the start and stop times of the counter or the value of Ta. At 1130, the RDEV B PHY entity 1104A sends a confirmation to the RDEV B MAC entity 1104B indicating that the timestamp report has been sent.

At 1132, the RDEV A PHY entity 1102A receives the timestamp report and sends a data indication to the RDEV A MAC entity 1102B to indicate that the timestamp report has been received. The data indication includes the start and stop times of the counter or the value of $T_{ta}^B$. Using the estimate of $T_{ta}^B$, the TOF can be computed as $$T_{TW} = \frac{T_r - T_{ta}^B}{2}.$$

As described above, the distance between the target node 1102 and the source node 1104 is given by $d=c*T_{TW}$, where c is the speed of light. With three distances to three source nodes 1104, the target node 1102 (or other positioning entity) can determine its location based on the known locations of the source nodes 1104.

At 1134, the RDEV A MAC entity 1102B sends a data request to the RDEV A PHY entity 1102A to send an acknowledgment (ACK) to the source node 1104. At 1136, the RDEV A PHY entity 1102A sends the acknowledgment to the source node 1104. At 1138, the RDEV A PHY entity 1102A sends a confirmation to the RDEV A MAC entity 1102B indicating that the acknowledgment has been sent. At 1140, the RDEV B PHY entity 1104A receives the acknowledgment and sends a data indication to the RDEV B MAC entity 1104B to indicate that the acknowledgment has been received.

One of the error sources in the TW-TOA ranging procedure 1100 is the clock offset. The crystal oscillators used in sensor devices (source or target nodes) may not work exactly with the nominal frequency, so there is a small positive or negative offset in the time measurements. With the high speed of light, this small offset may cause a significant error in the ranging. The SDS protocol is designed to mitigate the clock offset error. In an SDS-TW-TOA method, after the target node receives the ranging response, it sends a second ranging request to the source node. Consequently, each of the nodes will have an estimate of the round trip time, Tr, and turnaround time, $T_{ta}$. Finally, the source node sends a timestamp including the measured Tr and $T_{ta}^B$ to the target node.

Figure 12:
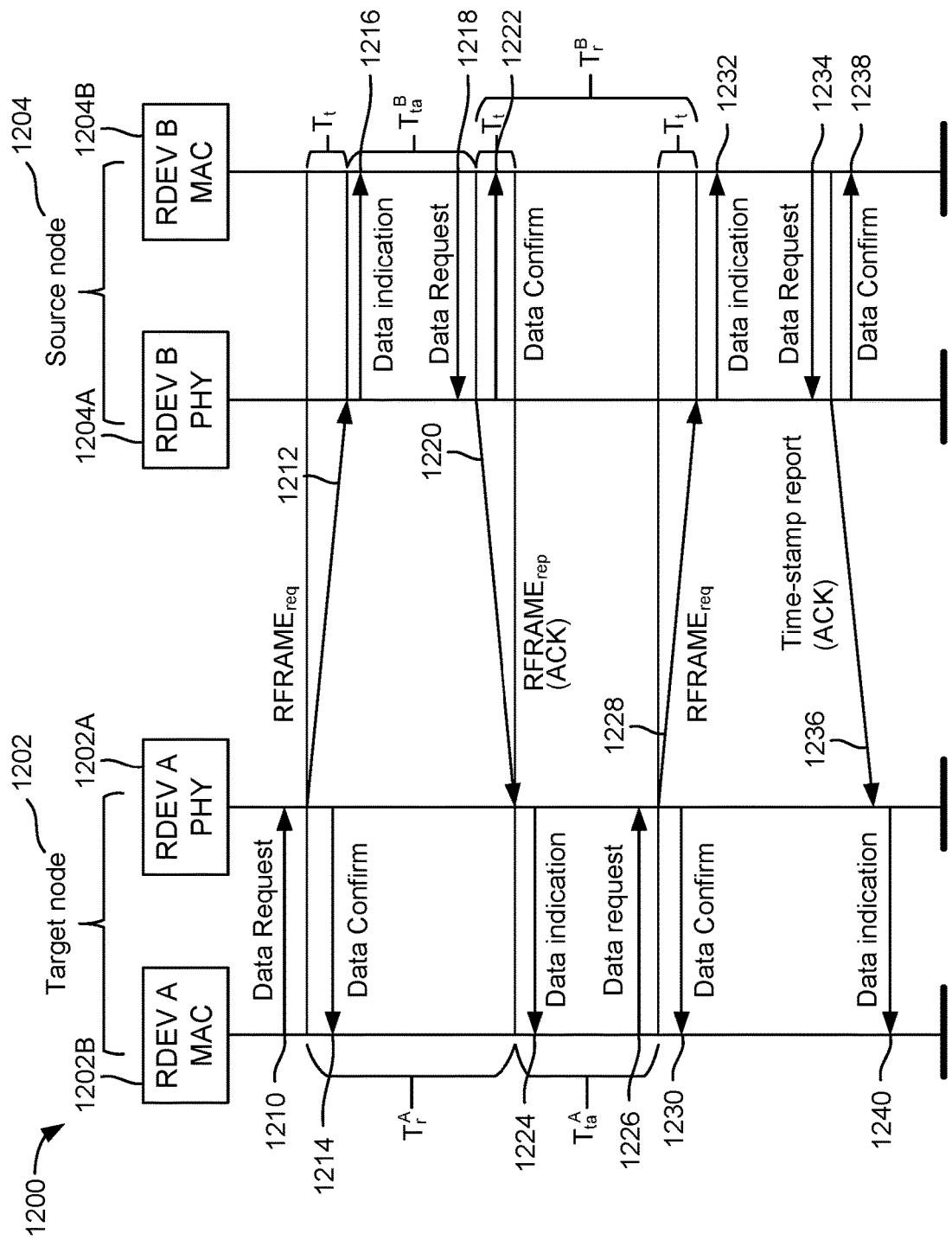
FIG. 12 illustrates an example symmetric double-sided TW-TOA (SDS-TW-TOA) ranging procedure

FIG. 12 illustrates an example SDS-TW-TOA ranging procedure 1200. The SDS-TW-TOA ranging procedure 1200 is performed between a target node 1202 (e.g., a UE, base station, AP, etc.) being positioned and a source node 1204 (e.g., another UE, base station, AP, etc.). The target node 1202 includes an RDEV A PHY entity 1202A and an RDEV A MAC entity 1202B. Similarly, the source node 1204 includes an RDEV B PHY entity 1204A and an RDEV B MAC entity 1204B. The term "RDEV" refers to a device capable of performing an SDS-TW-TOA ranging procedure 1200.

At 1210, the RDEV A MAC entity 1202B of the target node 1202 sends a data request to the RDEV A PHY entity 1202A to send a ranging request to the source node 1204. At 1212, the RDEV A PHY entity 1202A sends the ranging request, labeled "RFRAME$_{req}$," to the source node 1204, and records the departure time of the ranging request, labeled "T1." At 1214, the RDEV A PHY entity 1202A sends a confirmation to the RDEV A MAC entity 1202B indicating that the ranging request has been sent.

At 1216, the RDEV B PHY entity 1204A of the source node 1204 receives the ranging request and sends a data indication to the RDEV B MAC entity 1204B to indicate that a ranging request has been received. At 1218, the RDEV B MAC entity 1204B sends a data request to the RDEV B PHY entity 1204A to send a ranging response to the target node 1202. At 1220, the RDEV B PHY entity 1204A sends a ranging response, labeled "RFRAME$_{rep}$," to the target node 1202, and records the departure time of the ranging response, labeled "T3." The ranging response also includes an acknowledgment of the ranging request. At 1222, the RDEV B PHY entity 1204A sends a confirmation to the RDEV B MAC entity 1204B indicating that the ranging response has been sent.

To provide an estimate of the turnaround time at the source node 1204, labeled $T_{ta}^B$, to the target node 1202, the source node 1204 starts a counter (or timer) when the RDEV B PHY entity 1204A receives the first symbol of the SFD of the ranging request (at 1212) and stops when the RDEV B PHY entity 1204A sends the first symbol of the SFD of the ranging response (at 1220). The source node 1204 can save these values for later transmission to the target node 1202 (e.g., at 1236).

At 1224, the RDEV A PHY entity 1202A receives the ranging response and sends a data indication to the RDEV A MAC entity 1202B to indicate that the ranging response has been received. The target node 1202 records the arrival time of the ranging response, labeled "T2." The target node 1202 can then compute the round-trip time, labeled $T_r^A$, as $T_r^A = T2-T1$.

At 1226, the RDEV A MAC entity 1202B sends a data request to the RDEV A PHY entity 1202A to send a second ranging request to the source node 1204. At 1228, the RDEV A PHY entity 1202A sends the second ranging request to the source node 1204. At 1230, the RDEV A PHY entity 1202A sends a confirmation to the RDEV A MAC entity 1202B indicating that the second ranging request has been sent. At 1232, the RDEV B PHY entity 1204A receives the second ranging request, records the arrival time of the second ranging request, labeled "T4," and sends a data indication to the RDEV B MAC entity 1204B to indicate that the second ranging request has been received. The source node 1204 can then calculate its own round-trip time, labeled $T_r^B$, as $T_r^B = T4-T3$.

At 1234, the RDEV B MAC entity 1204B sends a data request to the RDEV B PHY entity 1204A to send a timestamp report to the target node 1202. At 1228, the RDEV B PHY entity 1204A sends the timestamp report to the target node 1202. The timestamp report includes the start and stop times of the counter or the value of Ta. The timestamp report may also include T3 and T4 or $T_r^B$. The timestamp report may also include an acknowledgment of the second ranging request. At 1230, the RDEV B PHY entity 1204A sends a confirmation to the RDEV B MAC entity 1204B indicating that the timestamp report has been sent.

The target node 1202 can compute its own turnaround time, labeled Tt, as the difference between the arrival time of the ranging response at 1220 and the transmission time of the second ranging request at 1228. For example, the target node 1202 may start a counter (or timer) when the RDEV A PHY entity 1202A receives the first symbol of the SFD of the ranging response (at 1220) and stop the counter when the RDEV A PHY entity 1202A sends the first symbol of the SFD of the second ranging request (at 1228).

The target node 1202 (or other positioning entity) can estimate the TOF between the target node 1202 and the source node 1204 as $$T_{SDS} = \frac{(T_r^A - T_{ta}^A) + (T_r^B - T_{ta}^B)}{4}.$$

The distance between the target node 1202 and the source node 1204 is given by d=c*$T_{SDS}$, where c is the speed of light. With three distances to three source nodes 1204, the target node 1202 (or other positioning entity) can determine its location based on the known locations of the source nodes 1204.

As discussed above, the target node (e.g., target node 1102/1202) may calculate an estimate of its own location. Alternatively, the target node may report the measurements of the ranging signals exchanged with the source node to a positioning entity in one or more measurement reports. In an IR-UWB system, the target node transmits these measurement reports to the positioning entity as one or more IR-UWB PPDUs (e.g., physical layer frame 1000). The positioning entity may be a location server (e.g., location server 230, LMF 270, SLP 272), a serving base station, another UE, a third-party application, etc.

As can be appreciated from the foregoing, TW-TOA is a simple solution to measure time of arrival while eliminating device-internal process time, and SDS-TW-TOA is a more advanced solution to mitigate the error from frequency offsets at both nodes.

Note that in indoor positioning systems, measured distances are not much more than 30 meters, and therefore, the maximum of $T_{TW}$ and $T_{SDS}$, which are the times it takes for light to travel about 30 meters, are on the order of 0.1 microseconds (μs). Another point is that the $T_{ta}$ is not just the response time of the node but also includes the duration of the packet, and is therefore on the order of milliseconds. Consequently, $T_{TW}$ and $T_{SDS}$ are much smaller than $T_{ta}$.

The present disclosure provides techniques for integrating IR-UWB-based ranging/positioning into LPP. In an aspect, capabilities and assistance data for IR-UWB configurations can be added to the current LPP signaling defined in 3GPP TS 37.355. Regarding additional capabilities, a UE may report whether or not it supports IR-UWB-based ranging/positioning integrated with LPP in an LPP provide capabilities message (e.g., as at 520 of FIG. 5). For example, a UE may report what type of SHR preamble(s) it supports (i.e., one or more of the eight types of preambles currently defined for the preamble field 1010), whether it supports TW-TOA and/or SDS-TW-TOA, and the like.

Regarding additional assistance data, a UE may receive assistance data for IR-UWB configurations. For example, the assistance data may indicate which SHR preamble to use (an index of a sequence that is used for preamble, the length of a sequence, the number of repetitions of a sequence, and the like), whether to use TW-TOA or SDS-TW-TOA, the carrier frequency for IR-UWB transmission, the transmission bandwidth for IR-UWB, and the like. The assistance data may further include some additional configurations, such as how to activate/indicate IR-UWB ranging/positioning, whether and/or how to report the measured results of IR-UWB ranging/positioning, and information enabling the joint use of NR-based positioning techniques and IR-UWB ranging/positioning.

The present disclosure also defines corresponding UE behaviors for ranging/positioning measurements and related communications (e.g., timestamp reports, measurement reports, etc.). As a first option, the positioning measurements and the communication related to those measurements are both performed in the IR-UWB system. In this option, the PPDU format (e.g., physical layer frame 1000) for IR-UWB systems based on IEEE 802.15.4a/4z is reused and contains all the needed preambles and information regarding ranging/positioning results over IR-UWB. That is, for example, PPDUs are used for both the ranging/positioning signals (e.g., ranging requests and ranging responses) and the messaging portion (e.g., the timestamp report at 1128 and 1236, any measurement report(s)).

As a second option, the measurements for the ranging/positioning is performed in the IR-UWB system, while the communication related to the ranging/positioning (e.g., timestamp report(s), measurement result(s), etc.) are carried out in the NR or LTE system. In this option, the SHR preamble (e.g., preamble field 1010 and SFD field 1020) of the PPDU format (e.g., physical layer frame 1000) for IR-UWB based on IEEE 802.15.4a/4z may be reused for the ranging/positioning signals (e.g., ranging requests and ranging responses). However, the messaging portion (e.g., the timestamp report at 1128 and 1236, any measurement report (s)) can be conveyed by LTE and/or NR data channels, as described further below.

As a third option, the measurements for the ranging/positioning are carried out jointly in the IR-UWB and LTE and/or NR systems. In this option, the SHR preamble of the PPDU format for IR-UWB based on IEEE 802.15.4a/4z is reused for ranging/positioning over IR-UWB, and one or more LTE and/or NR positioning procedures can additionally be utilized for further improvement (as described further below). The messaging portion can be delivered either by PPDUs of the IR-UWB system, as in the first option, or by LTE and/or NR data channels, as in the second option.

Figure 13:
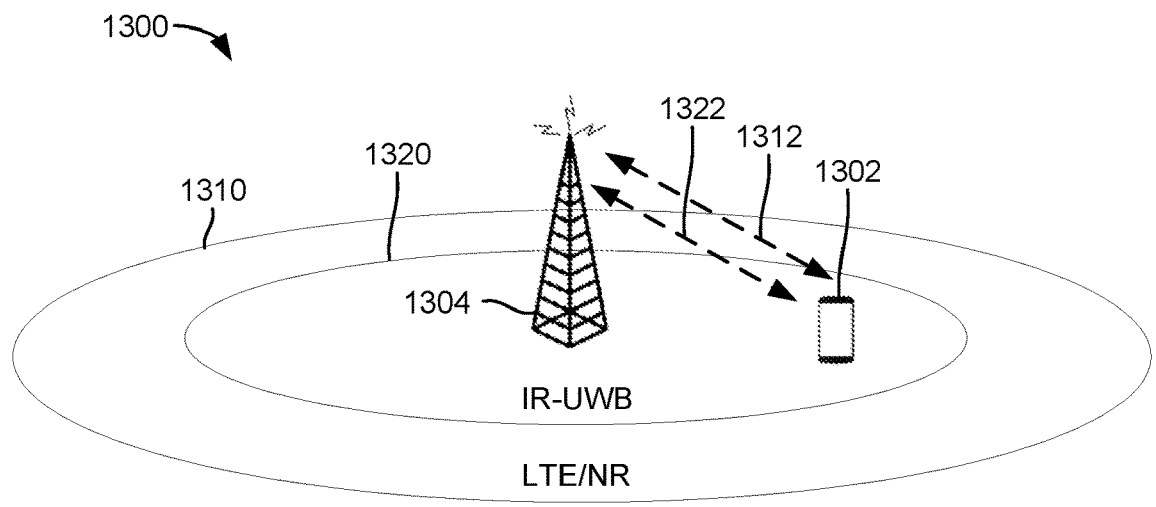
FIG. 13 illustrates an example wireless communications system in which a base station is in communication with a UE.

FIG. 13 illustrates an example wireless communications system 1300 in which a base station 1304 (e.g., any of the base stations described herein) is in communication with a UE 1302 (e.g., any of the UEs described herein). In the example of FIG. 13, the base station 1304 and the UE 1302 are both capable of communicating with each other via LTE and/or NR and IR-UWB. The base station 1304 is providing LTE and/or NR service in an LTE and/or NR coverage area 1310 and IR-UWB service in an IR-UWB coverage area 1320. The UE 1302 is within both the LTE and/or NR coverage area 1310 and the IR-UWB coverage area 1320, and there is both an LTE and/or NR communication link 1312 and an IR-UWB communication link 1322 established between the base station 1304 and the UE 1302.

Where the base station 1304 and the UE 1302 are employing the second option described above, the base station 1304 and the UE 1302 may use the IR-UWB communication link 1322 for ranging/positioning messages (e.g., ranging requests and responses) and the LTE and/or NR communication link 1312 for data communication (e.g., timestamp reports, payload data that would otherwise be carried in the PDSU of the ranging request and/or response, etc.). Thus, with reference to FIG. 11, the base station 1304 and the UE 1302 may exchange the ranging request and ranging response at 1112 and 1120, respectively, over the IR-UWB communication link 1322. However, the base station 1304 and the UE 1302 may exchange the timestamp report and acknowledgment at 1128 and 1136, respectively, over the LTE and/or NR communication link 1312.

Similarly, with reference to FIG. 12, the base station 1304 and the UE 1302 may exchange the ranging requests and ranging responses at 1212, 1220, and 1228 over the IR- UWB communication link 1322. In contrast, the base station 1304 and the UE 1302 may exchange the timestamp report and acknowledgments at 1220 and 1236 over the LTE and/or NR communication link 1312. In this scenario, the ranging requests and ranging responses (at 1112, 1120, 1212, 1220, 1228) may only include the SHR preamble (e.g., preamble field 1010 and SFD field 1020), rather than being an entire PPDU (e.g., an entire physical layer frame 1000). Alternatively, the remainder of the respective PPDUs may be null values. Any information conveyed in the PDSU of such a PPDU (e.g., an acknowledgement, as at 1220) would instead be conveyed on the LTE and/or NR communication link 1312.

Still referring to FIG. 13, where the base station 1304 and the UE 1302 are employing the third option described above, the base station 1304 and the UE 1302 may use the IR-UWB communication link 1322 for ranging/positioning messages (e.g., ranging requests and responses) and the LTE and/or NR communication link 1312 for both positioning (e.g., PRS, SRS) and data communication (e.g., timestamp reports for IR-UWB ranging/positioning, payload data that would otherwise be carried in the PDSU of a ranging request and/or response, LTE and/or NR measurement reports, etc.). Thus, in addition to the communication messages related to the IR-UWB ranging/positioning, the LTE and/or NR communication link 1312 would also be used for LTE and/or NR positioning techniques (e.g., RTT, OTDOA, DL-TDOA, E-CID, etc.).

Figure 14:
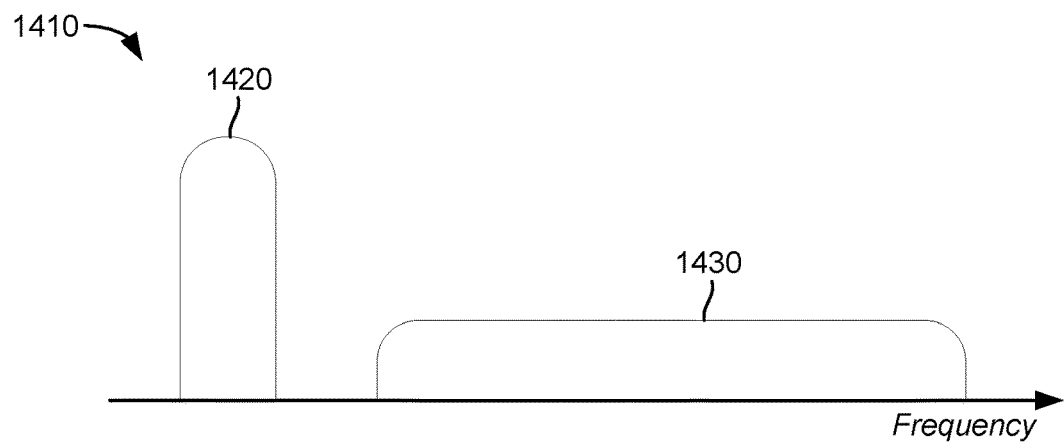
FIG. 14 illustrates two overlap scenarios for an LTE and/or New Radio (NR) carrier frequency and an IR-UWB carrier frequency.
Figure 14:
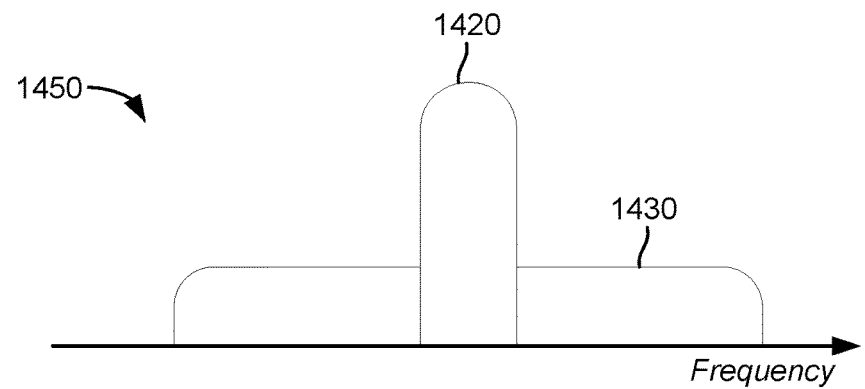

Note that the LTE and/or NR communication link 1312 and the IR-UWB communication link 1322 may operate on separate or overlapping frequencies. FIG. 14 illustrates two overlap scenarios for an LTE and/or NR carrier frequency 1420 and an IR-UWB carrier frequency 1430. In the first scenario 1410, the LTE and/or NR carrier frequency 1420 and the IR-UWB carrier frequency 1430 do not overlap, while in the second scenario 1450, the LTE and/or NR carrier frequency 1420 and the IR-UWB carrier frequency 1430 do overlap. As shown in FIG. 14, LTE and/or NR carrier frequencies can have a narrower bandwidth (e.g., 20 MHz or 100 MHz) than IR-UWB carrier frequencies. Further, overlapping carriers in the frequency domain does not necessarily mean that the carriers overlap in the time domain (i.e., carry data at the same time).

With further reference to the third option described herein, if there is tight synchronization and coordination between the LTE and/or NR transceiver (e.g., WWAN transceiver 310/350) and the IR-UWB transceiver (e.g., short-range wireless transceiver 320/360) at both the base station (e.g., base station 1304) and the UE (e.g., UE 1302), then two-step positioning is possible. In the first step, positioning information is obtained using an LTE or NR positioning procedure (e.g., RTT, OTDOA, DL-TDOA, E-CID, etc.). In the second step, positioning information is obtained and/or refined using an IR-UWB ranging/positioning procedure (e.g., TW-TOA ranging procedure 1100, SDS-TW-TOA ranging procedure 1200).

Figure 15:
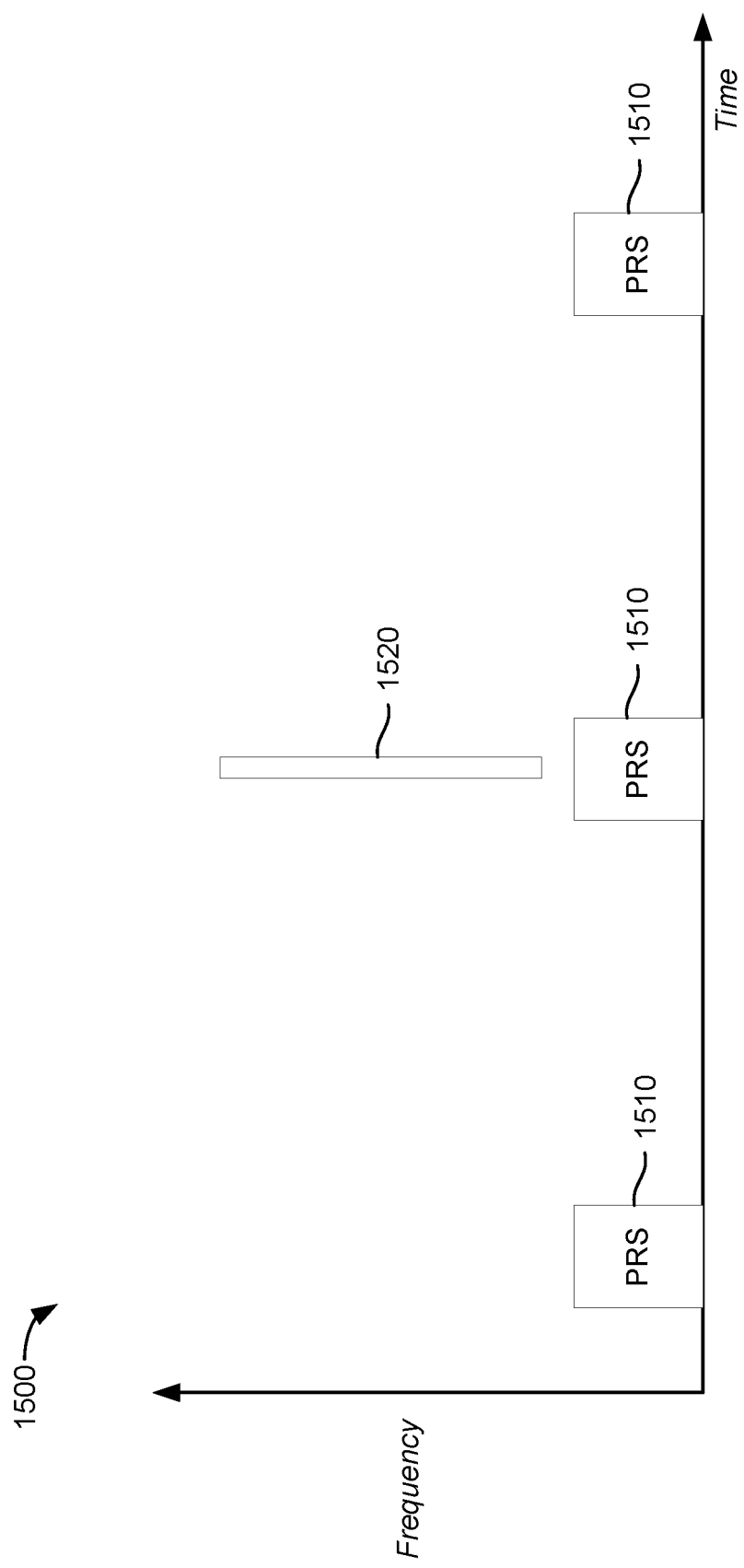
FIG. 15 is a diagram of an example positioning reference signal (PRS) and IR-UWB configuration for performing two-step positioning, according to aspects of the disclosure.

FIG. 15 is a diagram 1500 of an example PRS and IR-UWB configuration for performing two-step positioning, according to aspects of the disclosure. In FIG. 15, time is represented horizontally and frequency is represented vertically. In the example of FIG. 15, a transmitter (e.g., a UE 1302 or base station 1304) periodically transmits LTE/NR PRS 1510, with three repetitions shown in the figure. The repetitions may be, for example, repetitions of a PRS resource within a PRS occasion or repetitions of a PRS occasion. When engaged in a positioning session, the transmitter can transmit an IR-UWB ranging signal 1520 (referred to as an on-demand) that is associated with an LTE/NR PRS 1510 repetition. That is, the IR-UWB ranging signal 1520 is mapped to one or more time/frequency resources associated with (e.g., overlapping) the LTE/NR PRS 1510. Note that although FIG. 15 illustrates the LTE/NR PRS 1510 and IR-UWB ranging signal 1520 as not overlapping in frequency, they could overlap, as illustrated by scenario 1450 in FIG. 14.

Where the target (e.g., UE 1302) is the receiver, the target can measure at least the first LTE/NR PRS 1510 repetition in order to perform, or as part of, an LTE or NR positioning procedure. The target can also measure the IR-UWB ranging signal 1520 in order to perform, or as part of, an IR-UWB ranging/positioning procedure. Similarly, where the target is the transmitter, the target can transmit the LTE/NR PRS 1510 repetitions in order to perform, or as part of, an LTE or NR positioning procedure. The target can also transmit the IR-UWB ranging signal 1520 in order to perform, or as part of, an IR-UWB ranging/positioning procedure.

By being tightly synchronized, the receiver (e.g., UE 1302, base station 1304) can use the timing of the IR-UWB ranging signal 1520, as measured by the IR-UWB transceiver (e.g., short-range wireless transceiver 320), to refine the measurement(s) of the LTE/NR PRS 1510, as measured by the LTE and/or NR transceiver (e.g., WWAN transceiver 310). More specifically, the accuracy of the timing measurement (e.g., TOA) of the IR-UWB ranging signal 1520 will likely be better than the accuracy of the timing measurement of the LTE/NR PRS 1510 due to the larger bandwidth of the IR-UWB ranging signal 1520. If the IR-UWB ranging signal 1520 is associated with (e.g., overlapping or having some known offset in the time domain) an LTE/NR PRS 1510 repetition, the receiver can adjust (refine) the value of the measurement of the LTE/NR PRS 1510 repetition to match, or otherwise correspond to, the value of the measurement of the IR-UWB ranging signal 1520.

For example, the start of the IR-UWB ranging signal 1520 may be 2 ms after the start of the associated LTE/NR PRS 1510 repetition. The receiver's LTE/NR transceiver may measure the LTE/NR PRS 1510 repetition at time "T" and the receiver's IR-UWB transceiver may measure the IR-UWB ranging signal 1520 at time "T+2.2" ms. In that case, the receiver can adjust time T by 0.2 ms under the assumption that the measurement of the IR-UWB ranging signal 1520 is more accurate, and therefore the measurement of the LTE/NR PRS 1510 repetition is off by 0.2 ms.

The configuration(s) that the network provides to a UE to carry out the first, second, and third options may include the IR-UWB parameters, and for the second and third options, may include the NR and/or LTE parameters. The IR-UWB parameters may include the preamble format, TOA scheme (e.g., TW-TOA ranging procedure 1100 or SDS-TW-TOA ranging procedure 1200), information regarding the network nodes (e.g., base stations, positioning beacons, APs, other UEs, etc.) that can/will participate in the TOA method with the UE, etc. The NR and/or LTE parameters may include/identify which frequency band, cell, and/or component carrier is associated with the IR-UWB ranging/positioning signal(s) (e.g., the second LTE/NR PRS 1510 repetition in FIG. 15), PRS related parameters, information regarding the resource association between the LTE and/or NR frequency band, cell, and/or component carrier and the IR-UWB ranging signal(s) (e.g., the offset between the start of the identified PRS resource and the start of the IR-UWB ranging signal), etc.

In an aspect, the preamble (or PPDU format) for the IR-UWB ranging procedure may be activated (or triggered)

via LTE or NR signaling. For example, the network (e.g., serving base station) may use a MAC control element (MAC-CE) of an LTE or NR physical downlink shared channel (PDSCH) or downlink control information (DCI) of an LTE or NR physical downlink control channel (PDCCH) to enable (or trigger) the use of IR-UWB preambles for ranging procedures.

In an aspect, a new NR band may be defined for UWB communication in the UWB spectrum. For example, the EIRP limit of such a band may be limited to, for example, 41.3 dBm/MHz, and the channel bandwidth may be, for example, 500 MHz, as per the current regulatory requirements. The waveform could be either OFDM-based (as for NR) or IR-based (as for IR-UWB).

In an aspect, the NR frequency band in the UWB spectrum may be aggregated with another NR band in the licensed spectrum or the shared spectrum using the carrier aggregation (CA) or dual connectivity (DC) framework. For example, referring to FIG. 14, the LTE and/or NR carrier frequency 1420 and the IR-UWB carrier frequency 1430 may be aggregated together at the receiver using CA or DC. Carrier aggregation is a technique to increase the data rate per UE, whereby multiple component carriers are assigned to the same UE. Thus, one component carrier may be the LTE and/or NR carrier frequency 1420 and another component carrier may be the IR-UWB carrier frequency 1430. In dual connectivity, the UE separately receives LTE/NR and UWB signals (on respective transceivers) and then aggregates the streams.

Figure 16:
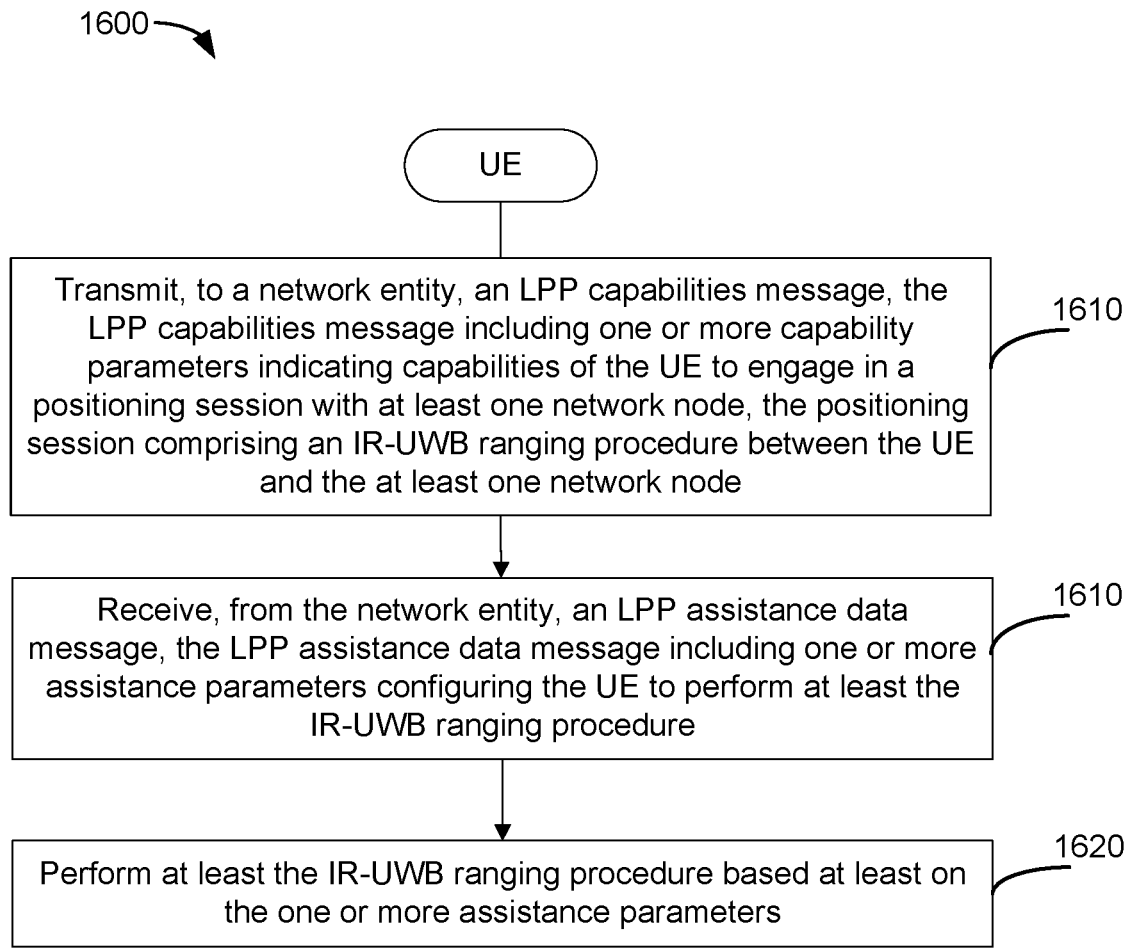
FIG. 16 illustrates an example method of wireless communication, according to aspects of the disclosure.

FIG. 16 illustrates an example method 1600 of wireless communication, according to aspects of the disclosure. In an aspect, method 1600 may be performed by a UE (e.g., any of the UEs described herein).

At 1610, the UE transmits, to a network entity (e.g., a location server, serving base station), an LPP capabilities message (e.g., as at 520 of FIG. 5), the LPP capabilities message including one or more capability parameters indicating capabilities of the UE to engage in a positioning session with at least one network node (e.g., a base station, AP, other UE, etc.), the positioning session comprising an IR-UWB ranging procedure (e.g., TW-TOA ranging procedure 1100, SDS-TW-TOA ranging procedure 1200) between the UE and the at least one network node. In an aspect, operation 1610 may be performed by WWAN transceiver 310, processing system 332, memory component 340, and/or positioning component 342, any or all of which may be considered means for performing this operation.

At 1620, the UE receives, from the network entity, an LPP assistance data message (e.g., as at 530 of FIG. 5), the LPP assistance data message including one or more assistance parameters configuring the UE to perform at least the IR-UWB ranging procedure. In an aspect, operation 1620 may be performed by WWAN transceiver 310, processing system 332, memory component 340, and/or positioning component 342, any or all of which may be considered means for performing this operation.

At 1630, the UE performs at least the IR-UWB ranging procedure based at least on the one or more assistance parameters. In an aspect, operation 1630 may be performed by WWAN transceiver 310, processing system 332, memory component 340, and/or positioning component 342, any or all of which may be considered means for performing this operation.

As will be appreciated, technical advantages of the method 1600 include the addition of another type of positioning procedure to LPP and improvement to positioning accuracy by using IR-UWB ranging procedures.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: transmitting, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; receiving, from the network entity, an LPP assistance data message, the LPP assistance data message including one or more assistance parameters configuring the UE to perform at least the IR-UWB ranging procedure; and performing at least the IR-UWB ranging procedure based at least on the one or more assistance parameters.

Clause 2. The method of clause 1, wherein the one or more capability parameters comprise: an identification of one or more synchronization header (SHR) preambles supported by the UE, whether the UE supports two-way time of arrival (TW-TOA) IR-UWB ranging procedures, whether the UE supports symmetric double-sided two-way time of arrival (SDS-TW-TOA) IR-UWB ranging procedures, or any combination thereof.

Clause 3. The method of any of clauses 1 to 2, wherein the one or more assistance parameters comprise: an indication of an IR-UWB SHR preamble to use for the IR-UWB ranging procedure, an indication of whether the IR-UWB ranging procedure is a TW-TOA IR-UWB ranging procedure or an SDS-TW-TOW IR-UWB ranging procedure, an indication of a carrier frequency to use for the IR-UWB ranging procedure, an identifier of the at least one network node, or any combination thereof.

Clause 4. The method of any of clauses 1 to 3, wherein the one or more assistance parameters comprise: an indication of how the IR-UWB ranging procedure will be activated by the network entity, an indication of whether the UE is expected to report results of the IR-UWB ranging procedure, an indication of how the UE is expected to report the results of the IR-UWB ranging procedure, an indication of whether joint positioning using an LTE or New Radio (NR) positioning procedure and the IR-UWB ranging procedure is enabled, or any combination thereof.

Clause 5. The method of any of clauses 1 to 4, wherein performing at least the IR-UWB ranging procedure comprises: transmitting at least one IR-UWB ranging request signal to the at least one network node over an IR-UWB communication link between the UE and the at least one network node; measuring at least one IR-UWB ranging response signal from the at least one network node over the IR-UWB communication link; and receiving a timestamp report from the at least one network node.

Clause 6. The method of clause 5, wherein: the timestamp report comprises an IR-UWB timestamp report, and the IR-UWB timestamp report is received over the IR-UWB communication link.

Clause 7. The method of clause 6, further comprising: transmitting a measurement report to a positioning entity using IR-UWB signaling.

Clause 8. The method of any of clauses 5 to 7, wherein: the timestamp report comprises an LTE or NR timestamp report, and the LTE or NR timestamp report is received over an LTE or NR communication link between the UE and the at least one network node.

Clause 9. The method of clause 8, wherein a bandwidth of the IR-UWB communication link overlaps a bandwidth of the LTE or NR communication link.

Clause 10. The method of clause 8, wherein a bandwidth of the IR-UWB communication link does not overlap a bandwidth of the LTE or NR communication link.

Clause 11. The method of any of clauses 8 to 10, further comprising: transmitting a measurement report to a positioning entity using LTE or NR signaling.

Clause 12. The method of any of clauses 5 to 11, further comprising: performing, over an LTE or NR communication link between the UE and the at least one network node, an LTE or NR positioning procedure with the at least one network node, in addition to the IR-UWB ranging procedure.

Clause 13. The method of clause 12, wherein performing the LTE or NR positioning procedure comprises: transmitting a measurement report for the LTE or NR positioning procedure to a positioning entity.

Clause 14. The method of clause 13, wherein transmitting the LPP capabilities message comprises: transmitting the measurement report to the positioning entity using IR-UWB signaling.

Clause 15. The method of any of clauses 13 to 14, wherein transmitting the LPP capabilities message comprises: transmitting the measurement report to the positioning entity using LTE or NR signaling.

Clause 16. The method of any of clauses 12 to 15, wherein a bandwidth of the IR-UWB communication link overlaps a bandwidth of the LTE or NR communication link.

Clause 17. The method of any of clauses 12 to 15, wherein a bandwidth of the IR-UWB communication link does not overlap a bandwidth of the LTE or NR communication link.

Clause 18. The method of any of clauses 12 to 17, wherein: the UE is equipped with an IR-UWB transceiver and an LTE or NR transceiver, the IR-UWB transceiver and the LTE or NR transceiver are synchronized, the IR-UWB ranging procedure is performed using the IR-UWB transceiver, and the LTE or NR positioning procedure is performed using the LTE or NR transceiver.

Clause 19. The method of clause 18, further comprising: adjusting one or more measurement results from the LTE or NR positioning procedure based on one or more measurement results from the IR-UWB ranging procedure.

Clause 20. The method of clause 19, wherein the IR-UWB ranging request signal, the IR-UWB ranging response signal, or both are mapped to one or more positioning reference signal (PRS) resources scheduled on the LTE or NR communication link to enable the UE to adjust the one or more measurement results from the LTE or NR positioning procedure based on the one or more measurement results from the IR-UWB ranging procedure.

Clause 21. The method of clause 20, wherein: the one or more PRS resources are scheduled periodically, and the IR-UWB ranging request signal, the IR-UWB ranging response signal, or both are scheduled on-demand.

Clause 22. The method of any of clauses 12 to 21, wherein the one or more assistance parameters comprise: an indication of a frequency band, cell, component carrier, or any combination thereof associated with the IR-UWB ranging request signal, the IR-UWB ranging response signal, or both, a configuration of PRS resources scheduled on the LTE or NR communication link, an indication of resource association between the LTE or NR communication link and the IR-UWB communication link, or any combination thereof.

Clause 23. The method of any of clauses 12 to 22, further comprising: aggregating the IR-UWB communication link and the LTE or NR communication link based on carrier aggregation, dual connectivity, or both.

Clause 24. The method of any of clauses 5 to 23, wherein the IR-UWB communication link comprises an NR communication link having an effective isotropic radiated power (EIRP) limit less than or equal to 41 decibel-milliwatts (dBm) and a channel bandwidth of 500 megahertz (MHz).

Clause 25. The method of clause 24, wherein a waveform of the IR-UWB ranging request signal, the IR-UWB ranging response signal, or both is an orthogonal frequency division multiplexing (OFDM) waveform.

Clause 26. The method of clause 24, wherein a waveform of the IR-UWB ranging request signal, the IR-UWB ranging response signal, or both is an IR-based waveform.

Clause 27. The method of any of clauses 1 to 26, further comprising: receiving, from the at least one network node, a trigger to perform the IR-UWB ranging procedure in a medium access control control element (MAC-CE), downlink control information (DCI), or both.

Clause 28. The method of any of clauses 1 to 27, wherein the network entity comprises a base station, another UE, an access point, or a positioning beacon.

Clause 29. A user equipment (UE), comprising: a memory; at least one transceiver; and at least one processor communicatively coupled to the memory and the at least one transceiver, the at least one processor configured to: transmit, via the at least one transceiver, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; receive, via the at least one transceiver, from the network entity, an LPP assistance data message, the LPP assistance data message including one or more assistance parameters configuring the UE to perform at least the IR-UWB ranging procedure; and perform at least the IR-UWB ranging procedure based at least on the one or more assistance parameters.

Clause 30. The UE of clause 29, wherein the one or more capability parameters comprise: an identification of one or more synchronization header (SHR) preambles supported by the UE, whether the UE supports two-way time of arrival (TW-TOA) IR-UWB ranging procedures, whether the UE supports symmetric double-sided two-way time of arrival (SDS-TW-TOA) IR-UWB ranging procedures, or any combination thereof.

Clause 31. The UE of any of clauses 29 to 30, wherein the one or more assistance parameters comprise: an indication of an IR-UWB SHR preamble to use for the IR-UWB ranging procedure, an indication of whether the IR-UWB ranging procedure is a TW-TOA IR-UWB ranging procedure or an SDS-TW-TOW IR-UWB ranging procedure, an indication of a carrier frequency to use for the IR-UWB ranging procedure, an identifier of the at least one network node, or any combination thereof.

Clause 32. The UE of any of clauses 29 to 31, wherein the one or more assistance parameters comprise: an indication of how the IR-UWB ranging procedure will be activated by the network entity, an indication of whether the UE is expected to report results of the IR-UWB ranging procedure, an indication of how the UE is expected to report the results of the IR-UWB ranging procedure, an indication of whether joint positioning using an LTE or New Radio (NR) positioning procedure and the IR-UWB ranging procedure is enabled, or any combination thereof.

Clause 33. The UE of any of clauses 29 to 32, wherein the at least one processor configured to perform at least the IR-UWB ranging procedure comprises the at least one processor configured to: transmit, via the at least one transceiver, at least one IR-UWB ranging request signal to the at least one network node over an IR-UWB communication link between the UE and the at least one network node; measure at least one IR-UWB ranging response signal from the at least one network node over the IR-UWB communication link; and receive, via the at least one transceiver, a timestamp report from the at least one network node.

Clause 34. The UE of clause 33, wherein: the timestamp report comprises an IR-UWB timestamp report, and the IR-UWB timestamp report is received over the IR-UWB communication link.

Clause 35. The UE of clause 34, wherein the at least one processor is further configured to: transmit, via the at least one transceiver, a measurement report to a positioning entity using IR-UWB signaling.

Clause 36. The UE of any of clauses 33 to 35, wherein: the timestamp report comprises an LTE or NR timestamp report, and the LTE or NR timestamp report is received over an LTE or NR communication link between the UE and the at least one network node.

Clause 37. The UE of clause 36, wherein a bandwidth of the IR-UWB communication link overlaps a bandwidth of the LTE or NR communication link.

Clause 38. The UE of clause 36, wherein a bandwidth of the IR-UWB communication link does not overlap a bandwidth of the LTE or NR communication link.

Clause 39. The UE of any of clauses 36 to 38, wherein the at least one processor is further configured to: transmit, via the at least one transceiver, a measurement report to a positioning entity using LTE or NR signaling.

Clause 40. The UE of any of clauses 33 to 39, wherein the at least one processor is further configured to: perform, over an LTE or NR communication link between the UE and the at least one network node, an LTE or NR positioning procedure with the at least one network node, in addition to the IR-UWB ranging procedure.

Clause 41. The UE of clause 40, wherein the at least one processor configured to perform the LTE or NR positioning procedure comprises the at least one processor configured to: transmit, via the at least one transceiver, a measurement report for the LTE or NR positioning procedure to a positioning entity.

Clause 42. The UE of clause 41, wherein the at least one processor configured to transmit the LPP capabilities message comprises the at least one processor configured to: transmit, via the at least one transceiver, the measurement report to the positioning entity using IR-UWB signaling.

Clause 43. The UE of any of clauses 41 to 42, wherein the at least one processor configured to transmit the LPP capabilities message comprises the at least one processor configured to: transmit, via the at least one transceiver, the measurement report to the positioning entity using LTE or NR signaling.

Clause 44. The UE of any of clauses 40 to 43, wherein a bandwidth of the IR-UWB communication link overlaps a bandwidth of the LTE or NR communication link.

Clause 45. The UE of any of clauses 40 to 43, wherein a bandwidth of the IR-UWB communication link does not overlap a bandwidth of the LTE or NR communication link.

Clause 46. The UE of any of clauses 40 to 45, wherein: the UE is equipped with an IR-UWB transceiver and an LTE or NR transceiver, the IR-UWB transceiver and the LTE or NR transceiver are synchronized, the IR-UWB ranging procedure is performed using the IR-UWB transceiver, and the LTE or NR positioning procedure is performed using the LTE or NR transceiver.

Clause 47. The UE of clause 46, wherein the at least one processor is further configured to: adjust one or more measurement results from the LTE or NR positioning procedure based on one or more measurement results from the IR-UWB ranging procedure.

Clause 48. The UE of clause 47, wherein the IR-UWB ranging request signal, the IR-UWB ranging response signal, or both are mapped to one or more positioning reference signal (PRS) resources scheduled on the LTE or NR communication link to enable the UE to adjust the one or more measurement results from the LTE or NR positioning procedure based on the one or more measurement results from the IR-UWB ranging procedure.

Clause 49. The UE of clause 48, wherein: the one or more PRS resources are scheduled periodically, and the IR- UWB ranging request signal, the IR-UWB ranging response signal, or both are scheduled on-demand.

Clause 50. The UE of any of clauses 40 to 49, wherein the one or more assistance parameters comprise: an indication of a frequency band, cell, component carrier, or any combination thereof associated with the IR-UWB ranging request signal, the IR-UWB ranging response signal, or both, a configuration of PRS resources scheduled on the LTE or NR communication link, an indication of resource association between the LTE or NR communication link and the IR-UWB communication link, or any combination thereof.

Clause 51. The UE of any of clauses 40 to 50, wherein the at least one processor is further configured to: aggregate the IR-UWB communication link and the LTE or NR communication link based on carrier aggregation, dual connectivity, or both.

Clause 52. The UE of any of clauses 33 to 51, wherein the IR-UWB communication link comprises an NR communication link having an effective isotropic radiated power (EIRP) limit less than or equal to 41 decibel-milliwatts (dBm) and a channel bandwidth of 500 megahertz (MHz).

Clause 53. The UE of clause 52, wherein a waveform of the IR-UWB ranging request signal, the IR-UWB ranging response signal, or both is an orthogonal frequency division multiplexing (OFDM) waveform.

Clause 54. The UE of clause 52, wherein a waveform of the IR-UWB ranging request signal, the IR-UWB ranging response signal, or both is an IR-based waveform.

Clause 55. The UE of any of clauses 29 to 54, wherein the at least one processor is further configured to: receive, via the at least one transceiver, from the at least one network node, a trigger to perform the IR-UWB ranging procedure in a medium access control control element (MAC-CE), downlink control information (DCI), or both.

Clause 56. The UE of any of clauses 29 to 55, wherein the network entity comprises a base station, another UE, an access point, or a positioning beacon.

Clause 57. A user equipment (UE), comprising: means for transmitting, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; means for receiving, from the network entity, an LPP assistance data message, the LPP assistance data message including one or more assistance parameters configuring the UE to perform at least the IR-UWB ranging procedure; and means for performing at least the IR-UWB ranging procedure based at least on the one or more assistance parameters.

Clause 58. The UE of clause 57, wherein the one or more capability parameters comprise: an identification of one or more synchronization header (SHR) preambles supported by the UE, whether the UE supports two-way time of arrival (TW-TOA) IR-UWB ranging procedures, whether the UE supports symmetric double-sided two-way time of arrival (SDS-TW-TOA) IR-UWB ranging procedures, or any combination thereof.

Clause 59. The UE of any of clauses 57 to 58, wherein the one or more assistance parameters comprise: an indication of an IR-UWB SHR preamble to use for the IR-UWB ranging procedure, an indication of whether the IR-UWB ranging procedure is a TW-TOA IR-UWB ranging procedure or an SDS-TW-TOW IR-UWB ranging procedure, an indication of a carrier frequency to use for the IR-UWB ranging procedure, an identifier of the at least one network node, or any combination thereof.

Clause 60. The UE of any of clauses 57 to 59, wherein the one or more assistance parameters comprise: an indication of how the IR-UWB ranging procedure will be activated by the network entity, an indication of whether the UE is expected to report results of the IR-UWB ranging procedure, an indication of how the UE is expected to report the results of the IR-UWB ranging procedure, an indication of whether joint positioning using an LTE or New Radio (NR) positioning procedure and the IR-UWB ranging procedure is enabled, or any combination thereof.

Clause 61. The UE of any of clauses 57 to 60, wherein the means for performing at least the IR-UWB ranging procedure comprises: means for transmitting at least one IR-UWB ranging request signal to the at least one network node over an IR-UWB communication link between the UE and the at least one network node; means for measuring at least one IR-UWB ranging response signal from the at least one network node over the IR-UWB communication link; and means for receiving a timestamp report from the at least one network node.

Clause 62. The UE of clause 61, wherein: the timestamp report comprises an IR-UWB timestamp report, and the IR-UWB timestamp report is received over the IR-UWB communication link.

Clause 63. The UE of clause 62, further comprising: means for transmitting a measurement report to a positioning entity using IR-UWB signaling.

Clause 64. The UE of any of clauses 61 to 63, wherein: the timestamp report comprises an LTE or NR timestamp report, and the LTE or NR timestamp report is received over an LTE or NR communication link between the UE and the at least one network node.

Clause 65. The UE of clause 64, wherein a bandwidth of the IR-UWB communication link overlaps a bandwidth of the LTE or NR communication link.

Clause 66. The UE of clause 64, wherein a bandwidth of the IR-UWB communication link does not overlap a bandwidth of the LTE or NR communication link.

Clause 67. The UE of any of clauses 64 to 66, further comprising: means for transmitting a measurement report to a positioning entity using LTE or NR signaling.

Clause 68. The UE of any of clauses 61 to 67, further comprising: means for performing, over an LTE or NR communication link between the UE and the at least one network node, an LTE or NR positioning procedure with the at least one network node, in addition to the IR-UWB ranging procedure.

Clause 69. The UE of clause 68, wherein the means for performing the LTE or NR positioning procedure comprises: means for transmitting a measurement report for the LTE or NR positioning procedure to a positioning entity.

Clause 70. The UE of clause 69, wherein the means for transmitting the LPP capabilities message comprises: means for transmitting the measurement report to the positioning entity using IR-UWB signaling.

Clause 71. The UE of any of clauses 69 to 70, wherein the means for transmitting the LPP capabilities message comprises: means for transmitting the measurement report to the positioning entity using LTE or NR signaling.

Clause 72. The UE of any of clauses 68 to 71, wherein a bandwidth of the IR-UWB communication link overlaps a bandwidth of the LTE or NR communication link.

Clause 73. The UE of any of clauses 68 to 71, wherein a bandwidth of the IR-UWB communication link does not overlap a bandwidth of the LTE or NR communication link.

Clause 74. The UE of any of clauses 68 to 73, wherein: the UE is equipped with an IR-UWB transceiver and an LTE or NR transceiver, the IR-UWB transceiver and the LTE or NR transceiver are synchronized, the IR-UWB ranging procedure is performed using the IR-UWB transceiver, and the LTE or NR positioning procedure is performed using the LTE or NR transceiver.

Clause 75. The UE of clause 74, further comprising: means for adjusting one or more measurement results from the LTE or NR positioning procedure based on one or more measurement results from the IR-UWB ranging procedure.

Clause 76. The UE of clause 75, wherein the IR-UWB ranging request signal, the IR-UWB ranging response signal, or both are mapped to one or more positioning reference signal (PRS) resources scheduled on the LTE or NR communication link to enable the UE to adjust the one or more measurement results from the LTE or NR positioning procedure based on the one or more measurement results from the IR-UWB ranging procedure.

Clause 77. The UE of clause 76, wherein: the one or more PRS resources are scheduled periodically, and the IR-UWB ranging request signal, the IR-UWB ranging response signal, or both are scheduled on-demand.

Clause 78. The UE of any of clauses 68 to 77, wherein the one or more assistance parameters comprise: an indication of a frequency band, cell, component carrier, or any combination thereof associated with the IR-UWB ranging request signal, the IR-UWB ranging response signal, or both, a configuration of PRS resources scheduled on the LTE or NR communication link, an indication of resource association between the LTE or NR communication link and the IR-UWB communication link, or any combination thereof.

Clause 79. The UE of any of clauses 68 to 78, further comprising: means for aggregating the IR-UWB communication link and the LTE or NR communication link based on carrier aggregation, dual connectivity, or both.

Clause 80. The UE of any of clauses 61 to 79, wherein the IR-UWB communication link comprises an NR communication link having an effective isotropic radiated power (EIRP) limit less than or equal to 41 decibel-milliwatts (dBm) and a channel bandwidth of 500 megahertz (MHz).

Clause 81. The UE of clause 80, wherein a waveform of the IR-UWB ranging request signal, the IR-UWB ranging response signal, or both is an orthogonal frequency division multiplexing (OFDM) waveform.

Clause 82. The UE of clause 80, wherein a waveform of the IR-UWB ranging request signal, the IR-UWB ranging response signal, or both is an IR-based waveform.

Clause 83. The UE of any of clauses 57 to 82, further comprising: means for receiving, from the at least one network node, a trigger to perform the IR-UWB ranging procedure in a medium access control control element (MAC-CE), downlink control information (DCI), or both.

Clause 84. The UE of any of clauses 57 to 83, wherein the network entity comprises a base station, another UE, an access point, or a positioning beacon.

Clause 85. A non-transitory computer-readable medium storing computer-executable instructions that, when executed by a user equipment (UE), cause the UE to: transmit, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node; receive, from the network entity, an LPP assistance data message, the LPP assistance data message including one or more assistance parameters configuring the UE to perform at least the IR-UWB ranging procedure; and perform at least the IR-UWB ranging procedure based at least on the one or more assistance parameters.

Clause 86. The non-transitory computer-readable medium of clause 85, wherein the one or more capability parameters comprise: an identification of one or more synchronization header (SHR) preambles supported by the UE, whether the UE supports two-way time of arrival (TW-TOA) IR-UWB ranging procedures, whether the UE supports symmetric double-sided two-way time of arrival (SDS-TW-TOA) IR-UWB ranging procedures, or any combination thereof.

Clause 87. The non-transitory computer-readable medium of any of clauses 85 to 86, wherein the one or more assistance parameters comprise: an indication of an IR-UWB SHR preamble to use for the IR-UWB ranging procedure, an indication of whether the IR-UWB ranging procedure is a TW-TOA IR-UWB ranging procedure or an SDS-TW-TOW IR-UWB ranging procedure, an indication of a carrier frequency to use for the IR-UWB ranging procedure, an identifier of the at least one network node, or any combination thereof.

Clause 88. The non-transitory computer-readable medium of any of clauses 85 to 87, wherein the one or more assistance parameters comprise: an indication of how the IR-UWB ranging procedure will be activated by the network entity, an indication of whether the UE is expected to report results of the IR-UWB ranging procedure, an indication of how the UE is expected to report the results of the IR-UWB ranging procedure, an indication of whether joint positioning using an LTE or New Radio (NR) positioning procedure and the IR-UWB ranging procedure is enabled, or any combination thereof.

Clause 89. The non-transitory computer-readable medium of any of clauses 85 to 88, wherein the computer-executable instructions that, when executed by the UE, cause the UE to perform at least the IR-UWB ranging procedure comprise computer-executable instructions that, when executed by the UE, cause the UE to: transmit at least one IR-UWB ranging request signal to the at least one network node over an IR-UWB communication link between the UE and the at least one network node; measure at least one IR-UWB ranging response signal from the at least one network node over the IR-UWB communication link; and receive a timestamp report from the at least one network node.

Clause 90. The non-transitory computer-readable medium of clause 89, wherein: the timestamp report comprises an IR-UWB timestamp report, and the IR-UWB timestamp report is received over the IR-UWB communication link.

Clause 91. The non-transitory computer-readable medium of clause 90, further comprising computer-executable instructions that, when executed by the UE, cause the UE to: transmit a measurement report to a positioning entity using IR-UWB signaling.

Clause 92. The non-transitory computer-readable medium of any of clauses 89 to 91, wherein: the timestamp report comprises an LTE or NR timestamp report, and the LTE or NR timestamp report is received over an LTE or NR communication link between the UE and the at least one network node.

Clause 93. The non-transitory computer-readable medium of clause 92, wherein a bandwidth of the IR-UWB communication link overlaps a bandwidth of the LTE or NR communication link.

Clause 94. The non-transitory computer-readable medium of clause 92, wherein a bandwidth of the IR-UWB communication link does not overlap a bandwidth of the LTE or NR communication link.

Clause 95. The non-transitory computer-readable medium of any of clauses 92 to 94, further comprising computer-executable instructions that, when executed by the UE, cause the UE to: transmit a measurement report to a positioning entity using LTE or NR signaling.

Clause 96. The non-transitory computer-readable medium of any of clauses 89 to 95, further comprising computer-executable instructions that, when executed by the UE, cause the UE to: perform, over an LTE or NR communication link between the UE and the at least one network node, an LTE or NR positioning procedure with the at least one network node, in addition to the IR-UWB ranging procedure.

Clause 97. The non-transitory computer-readable medium of clause 96, wherein the computer-executable instructions that, when executed by the UE, cause the UE to perform the LTE or NR positioning procedure comprise computer-executable instructions that, when executed by the UE, cause the UE to: transmit a measurement report for the LTE or NR positioning procedure to a positioning entity.

Clause 98. The non-transitory computer-readable medium of clause 97, wherein the computer-executable instructions that, when executed by the UE, cause the UE to transmit the LPP capabilities message comprise computer-executable instructions that, when executed by the UE, cause the UE to: transmit the measurement report to the positioning entity using IR-UWB signaling.

Clause 99. The non-transitory computer-readable medium of any of clauses 97 to 98, wherein the computer-executable instructions that, when executed by the UE, cause the UE to transmit the LPP capabilities message comprise computer-executable instructions that, when executed by the UE, cause the UE to: transmit the measurement report to the positioning entity using LTE or NR signaling.

Clause 100. The non-transitory computer-readable medium of any of clauses 96 to 99, wherein a bandwidth of the IR-UWB communication link overlaps a bandwidth of the LTE or NR communication link.

Clause 101. The non-transitory computer-readable medium of any of clauses 96 to 99, wherein a bandwidth of the IR-UWB communication link does not overlap a bandwidth of the LTE or NR communication link.

Clause 102. The non-transitory computer-readable medium of any of clauses 96 to 101, wherein: the UE is equipped with an IR-UWB transceiver and an LTE or NR transceiver, the IR-UWB transceiver and the LTE or NR transceiver are synchronized, the IR-UWB ranging procedure is performed using the IR-UWB transceiver, and the LTE or NR positioning procedure is performed using the LTE or NR transceiver.

Clause 103. The non-transitory computer-readable medium of clause 102, further comprising computer-executable instructions that, when executed by the UE, cause the UE to: adjust one or more measurement results from the LTE or NR positioning procedure based on one or more measurement results from the IR-UWB ranging procedure.

Clause 104. The non-transitory computer-readable medium of clause 103, wherein the IR-UWB ranging request signal, the IR-UWB ranging response signal, or both are mapped to one or more positioning reference signal (PRS) resources scheduled on the LTE or NR communication link to enable the UE to adjust the one or more measurement results from the LTE or NR positioning procedure based on the one or more measurement results from the IR-UWB ranging procedure.

Clause 105. The non-transitory computer-readable medium of clause 104, wherein: the one or more PRS resources are scheduled periodically, and the IR-UWB ranging request signal, the IR-UWB ranging response signal, or both are scheduled on-demand.

Clause 106. The non-transitory computer-readable medium of any of clauses 96 to 105, wherein the one or more assistance parameters comprise: an indication of a frequency band, cell, component carrier, or any combination thereof associated with the IR-UWB ranging request signal, the IR-UWB ranging response signal, or both, a configuration of PRS resources scheduled on the LTE or NR communication link, an indication of resource association between the LTE or NR communication link and the IR-UWB communication link, or any combination thereof.

Clause 107. The non-transitory computer-readable medium of any of clauses 96 to 106, further comprising computer-executable instructions that, when executed by the UE, cause the UE to: aggregate the IR-UWB communication link and the LTE or NR communication link based on carrier aggregation, dual connectivity, or both.

Clause 108. The non-transitory computer-readable medium of any of clauses 89 to 107, wherein the IR-UWB communication link comprises an NR communication link having an effective isotropic radiated power (EIRP) limit less than or equal to 41 decibel-milliwatts (dBm) and a channel bandwidth of 500 megahertz (MHz).

Clause 109. The non-transitory computer-readable medium of clause 108, wherein a waveform of the IR-UWB ranging request signal, the IR-UWB ranging response signal, or both is an orthogonal frequency division multiplexing (OFDM) waveform.

Clause 110. The non-transitory computer-readable medium of clause 108, wherein a waveform of the IR-UWB ranging request signal, the IR-UWB ranging response signal, or both is an IR-based waveform.

Clause 111. The non-transitory computer-readable medium of any of clauses 85 to 110, further comprising computer-executable instructions that, when executed by the UE, cause the UE to: receive, from the at least one network node, a trigger to perform the IR-UWB ranging procedure in a medium access control control element (MAC-CE), downlink control information (DCI), or both.

Clause 112. The non-transitory computer-readable medium of any of clauses 85 to 111, wherein the network entity comprises a base station, another UE, an access point, or a positioning beacon.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    transmitting, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node;
    receiving, from the network entity, an LPP assistance data message, the LPP assistance data message including one or more assistance parameters configuring the UE to perform at least the IR-UWB ranging procedure; and
    performing at least the IR-UWB ranging procedure based at least on the one or more assistance parameters, wherein the one or more capability parameters comprise:

an identification of one or more synchronization header (SHR) preambles supported by the UE,
whether the UE supports two-way time of arrival (TW-TOA) IR-UWB ranging procedures,
whether the UE supports symmetric double-sided two-way time of arrival (SDS-TW-TOA) IR-UWB ranging procedures, or
any combination thereof.

2. The method of claim 1, wherein the one or more assistance parameters comprise:
an indication of an IR-UWB SHR preamble to use for the IR-UWB ranging procedure,
an indication of whether the IR-UWB ranging procedure is a TW-TOA IR-UWB ranging procedure or an SDS-TW-TOW IR-UWB ranging procedure,
an indication of a carrier frequency to use for the IR-UWB ranging procedure,
an identifier of the at least one network node, or
any combination thereof.

3. The method of claim 1, wherein the one or more assistance parameters comprise:
an indication of how the IR-UWB ranging procedure will be activated by the network entity,
an indication of whether the UE is expected to report results of the IR-UWB ranging procedure,
an indication of how the UE is expected to report the results of the IR-UWB ranging procedure,
an indication of whether joint positioning using an LTE or New Radio (NR) positioning procedure and the IR-UWB ranging procedure is enabled, or
any combination thereof.

4. The method of claim 1, wherein performing at least the IR-UWB ranging procedure comprises:
transmitting at least one IR-UWB ranging request signal to the at least one network node over an IR-UWB communication link between the UE and the at least one network node;
measuring at least one IR-UWB ranging response signal from the at least one network node over the IR-UWB communication link; and
receiving a timestamp report from the at least one network node.

5. The method of claim 4, wherein:
the timestamp report comprises an IR-UWB timestamp report, and
the IR-UWB timestamp report is received over the IR-UWB communication link.

6. The method of claim 5, further comprising:
transmitting a measurement report to a positioning entity using IR-UWB signaling.

7. The method of claim 4, wherein:
the timestamp report comprises an LTE or NR timestamp report, and
the LTE or NR timestamp report is received over an LTE or NR communication link between the UE and the at least one network node.

8. The method of claim 7, wherein a bandwidth of the IR-UWB communication link overlaps a bandwidth of the LTE or NR communication link.

9. The method of claim 7, wherein a bandwidth of the IR-UWB communication link does not overlap a bandwidth of the LTE or NR communication link.

10. The method of claim 7, further comprising:
transmitting a measurement report to a positioning entity using LTE or NR signaling.

11. The method of claim 4, further comprising:
performing, over an LTE or NR communication link between the UE and the at least one network node, an LTE or NR positioning procedure with the at least one network node, in addition to the IR-UWB ranging procedure.

12. The method of claim 11, wherein performing the LTE or NR positioning procedure comprises:
transmitting a measurement report for the LTE or NR positioning procedure to a positioning entity.

13. The method of claim 12, wherein transmitting the LPP capabilities message comprises:
transmitting the measurement report to the positioning entity using IR-UWB signaling.

14. The method of claim 12, wherein transmitting the LPP capabilities message comprises:
transmitting the measurement report to the positioning entity using LTE or NR signaling.

15. The method of claim 11, wherein a bandwidth of the IR-UWB communication link overlaps a bandwidth of the LTE or NR communication link.

16. The method of claim 11, wherein a bandwidth of the IR-UWB communication link does not overlap a bandwidth of the LTE or NR communication link.

17. The method of claim 11, wherein:
the UE is equipped with an IR-UWB transceiver and an LTE or NR transceiver,
the IR-UWB transceiver and the LTE or NR transceiver are synchronized,
the IR-UWB ranging procedure is performed using the IR-UWB transceiver, and
the LTE or NR positioning procedure is performed using the LTE or NR transceiver.

18. The method of claim 17, further comprising:
adjusting one or more measurement results from the LTE or NR positioning procedure based on one or more measurement results from the IR-UWB ranging procedure.

19. The method of claim 18, wherein the IR-UWB ranging request signal, the IR-UWB ranging response signal, or both are mapped to one or more positioning reference signal (PRS) resources scheduled on the LTE or NR communication link to enable the UE to adjust the one or more measurement results from the LTE or NR positioning procedure based on the one or more measurement results from the IR-UWB ranging procedure.

20. The method of claim 19, wherein:
the one or more PRS resources are scheduled periodically, and
the IR-UWB ranging request signal, the IR-UWB ranging response signal, or both are scheduled on-demand.

21. The method of claim 11, wherein the one or more assistance parameters comprise:
an indication of a frequency band, cell, component carrier, or any combination thereof associated with the IR-UWB ranging request signal, the IR-UWB ranging response signal, or both,
a configuration of PRS resources scheduled on the LTE or NR communication link,
an indication of resource association between the LTE or NR communication link and the IR-UWB communication link, or
any combination thereof.

22. The method of claim 11, further comprising:
aggregating the IR-UWB communication link and the LTE or NR communication link based on carrier aggregation, dual connectivity, or both.

23. The method of claim 4, wherein the IR-UWB communication link comprises an NR communication link having an effective isotropic radiated power (EIRP) limit less than or equal to 41 decibel-milliwatts (dBm) and a channel bandwidth of 500 megahertz (MHz).

24. The method of claim 23, wherein a waveform of the IR-UWB ranging request signal, the IR-UWB ranging response signal, or both is:
an orthogonal frequency division multiplexing (OFDM) waveform,
an IR-based waveform.

25. The method of claim 1, further comprising:
receiving, from the at least one network node, a trigger to perform the IR-UWB ranging procedure in a medium access control control element (MAC-CE), downlink control information (DCI), or both.

26. The method of claim 1, wherein the network entity comprises a base station, another UE, an access point, or a positioning beacon.

27. A user equipment (UE), comprising:
a memory;
at least one transceiver; and
at least one processor communicatively coupled to the memory and the at least one transceiver, the at least one processor configured to:
transmit, via the at least one transceiver, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node;
receive, via the at least one transceiver, from the network entity, an LPP assistance data message, the LPP assistance data message including one or more assistance parameters configuring the UE to perform at least the IR-UWB ranging procedure; and
perform at least the IR-UWB ranging procedure based at least on the one or more assistance parameters, wherein the one or more capability parameters comprise:
an identification of one or more synchronization header (SHR) preambles supported by the UE,
whether the UE supports two-way time of arrival (TW-TOA) IR-UWB ranging procedures,
whether the UE supports symmetric double-sided two-way time of arrival (SDS-TW-TOA) IR-UWB ranging procedures, or
any combination thereof.

28. A user equipment (UE), comprising:
means for transmitting, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node;
means for receiving, from the network entity, an LPP assistance data message, the LPP assistance data message including one or more assistance parameters configuring the UE to perform at least the IR-UWB ranging procedure;
means for receiving, from the at least one network node, a trigger to perform the IR-UWB ranging procedure in a medium access control-control element (MAC-CE), downlink control information (DCI), or both; and
means for performing at least the IR-UWB ranging procedure based at least on the one or more assistance parameters.

29. A non-transitory computer-readable medium storing computer-executable instructions that, when executed by a user equipment (UE), cause the UE to:
transmit, to a network entity, a Long-Term Evolution (LTE) positioning protocol (LPP) capabilities message, the LPP capabilities message including one or more capability parameters indicating capabilities of the UE to engage in a positioning session with at least one network node, the positioning session comprising an impulse radio ultra-wideband (IR-UWB) ranging procedure between the UE and the at least one network node;
receive, from the network entity, an LPP assistance data message, the LPP assistance data message including one or more assistance parameters configuring the UE to perform at least the IR-UWB ranging procedure;
receive, from the at least one network node, a trigger to perform the IR-UWB ranging procedure in a medium access control-control element (MAC-CE), downlink control information (DCI), or both; and
perform at least the IR-UWB ranging procedure based at least on the one or more assistance parameters.

* * * * *